United States Patent [19]

Boatwright et al.

[11] 4,232,199

[45] Nov. 4, 1980

[54] SPECIAL SERVICES ADD-ON FOR DIAL PULSE ACTIVATED TELEPHONE SWITCHING OFFICE

[75] Inventors: John T. Boatwright, Concord; David G. Prince, New Durham; William F. Haskett; Helmut Koch, both of Concord, all of N.H.

[73] Assignee: Summa Four, Inc., Concord, N.H.

[21] Appl. No.: 952,487

[22] Filed: Oct. 18, 1978

[51] Int. Cl.$^2$ .................. H04M 1/66; H04M 3/42
[52] U.S. Cl. .................. 179/18 B; 179/16 EC; 179/18 DA; 179/18 ES; 179/99 H
[58] Field of Search ........... 179/18 B, 18 BA, 18 BD, 179/18 BE, 18 BG, 16 EC, 18 D, 18 DA, 18 ES, 99 H

[56] References Cited

U.S. PATENT DOCUMENTS

| | | | |
|---|---|---|---|
| 3,363,063 | 1/1968 | Kandel et al. | 179/18 BD |
| 3,546,393 | 12/1970 | Joel, Jr. | 179/18 B |
| 3,689,703 | 9/1972 | Allen et al. | 179/18 B |
| 3,710,033 | 1/1973 | Whitney | 179/18 BE |
| 3,959,600 | 5/1976 | Sousa | 179/18 BE |
| 3,997,731 | 12/1976 | Wilmot et al. | 179/18 B |

Primary Examiner—Thomas W. Brown
Attorney, Agent, or Firm—Cesari & McKenna

[57] ABSTRACT

A special services add-on specifically adapted for use in a dial pulse activated telephone switching office such as a step-by-step office to enable the addition of various modern features thereto, thereby extending the economic life of the office. The add-on is a stored program, processor based system that can be put into service on a line-by-line basis independent of subscriber line assignments. Among the special services provided by the add-on are incoming call alert, call conferencing, call forwarding, tone dialing, abbreviated dialing, instant recall, restricted calling, ringback, delayed ringback and ring disable. Various of the services are remotely controllable by the subscriber by dialing programming instructions to the add-on either from his own or another telephone subset.

41 Claims, 7 Drawing Figures

| SUBSCRIBER PROGRAMMING INSTRUCTION SUMMARY ||
|---|---|
| TO PROGRAM | DIAL THE PROGRAM CODE – PLUS ... |
| INCOMING CALL ALERT | ...91, to turn it ON.<br>...90, to turn it OFF. |
| IMMEDIATE RINGBACK | ...11, then on-hook. Subset rings in a few seconds. |
| DELAYED RINGBACK | ...12, plus identification code, plus the time you want the ringback ending in A or P for AM or PM; (for example: 745A for 7:45 AM, 335P for 3:35 PM).<br><br>...10, plus identification code to turn it OFF. |
| RING DISABLE | ...13, plus identification code, plus time you want subset to ring again (entry of time the same as delayed ringback).<br><br>...10, plus identification code to turn it OFF. |
| CALL FORWARDING | ...31, plus identification code plus forwarding telephone number.<br><br>...30, plus identification code to turn it OFF. |
| ABBREVIATED DIALING | ...2, plus the "memory number," plus identification code, then the telephone number to be stored. (for example: to store 275-1234 in memory number 4, dial the program code, 24, the I.D. code, 275-1234, then on hook.) |
| TOLL RESTRICTION | ...71, plus identification code to turn it ON.<br><br>...70, plus identification code to turn it OFF. |
| INCOMING ONLY RESTRICTION | ...72, plus identification code to turn it ON.<br><br>...70, plus identification code to turn it OFF. |

FIG.2

SPECIAL SERVICES ADD-ON FOR DIAL PULSE ACTIVATED TELEPHONE SWITCHING OFFICE

BACKGROUND OF THE INVENTION

1. Field of the Invention

This invention relates generally to telephony and, more particularly, to a processor based, subscriber programmable add-on for a dial pulse activated telephone switching office to enable the office to provide various modern special services on a subscriber-by-subscriber basis.

2. Description of the Prior Art

Early in the history of telephony, it became apparent that it would be physically and economically impossible to serve the rapidly growing number of telephone subscribers with the then existing network of manual switchboards. This thinking lead to the invention and implementation of the first commercially successful automatic telephone switching system, the so called step-by-step system. The step-by-step system is a direct, progressive type of switching system that is controlled by dial pulses generated at the subscribers' telephone subset in establishing connections to other subscribers through the telephone network. At the heart of the system is a two-motion electrochemical stepping switch commonly known as the Strowger switch in honor of its inventor. The Strowger switch as a form of cylindrical symmetry with wiper contacts that, in response to dial pulses, are advanced in increments vertically and angularly to interconnect sets of terminals. Because the contacts of the individual switches involved in a call connection hold their advanced positions during the course of the call, the step-by-step system had the advantage not only of being automatic, but also of providing a memory for the switching path once the connection was made. This, combined wih advantages in terms of improved reliability, increased capacity and lower cost as compared to the manual network, made the step-by-step system the most prevalent of new telephone switching systems installed during the four decades spanning the 1920's to the 1960's.

As technology advanced and telephone demands grew, other more flexible, higher capacity switching arrangements were introduced. The crossbar switch represented a major advance in telephone switching. The crossbar, as its name implies, involves a mechanical matrix of selecting bars, oriented in horizontal and vertical rows, which can establish electrical connections at any of its various crosspoints in response to the operation of relay-type control mechanisms. Crossbar switches, like stepping switches, are capable of holding a switch path once a connection is made therethrough and, at first were used in direct, dial pulse controlled systems, in effect replacing stepping switches. As time progressed, however, the crossbar switches were used to implement the common control concept. In a typical common control system, common circuitry is provided which receives and temporarily stores the dial pulses from a subscriber subset and translates the pulses into control signals that operate the appropriate crosspoints in a crossbar switch to establish the desired connection. Once the connection is made, the common circuitry stores the switch path in a memory separate from the crossbar switch and is then available to operate other crosspoints for other calls.

Common control systems of the type are inherently capable of handling higher call densities than step-by-step systems and thus enabled the telephone companies to meet ever increasing telephone demands, particularly in densely populated areas. Common control systems also enabled the telephone companies to provide new and improved services, such as direct distance dialing and extended area dialing, that could not be provided by conventional step-by-step systems.

As technology continued to advance and telephone demands continued to grow, both in terms of numbers and in terms of the scope of services desired, modern day electronic switching systems evolved. These electronic systems also rely upon the common control concept but typically involve the use of extremely high speed, high density electronic crosspoint switches. The more advanced electronic systems also include a full scale computer that not only stores switch path information but also supervises and controls the entire switching arrangement. The use of a programmed computer to control switching operations contributed great flexibility to switching since the stored program offered a changeable memory and logic. This flexibility enabled the telephone companies to offer subscribers many new special services, such as call conferencing, call forwarding, abbreviated dialing and the like, that they were not able to offer with the more conventional systems.

Today, almost all new switching systems being installed by the telephone companies are of the electronic common control variety. There are few, if any, new step-by-step systems being installed. Nevertheless, the step-by-step system is still dominant in the total number of switching offices presently in use. Because of the recognized superiority of electronic systems in tems of their higher capacities and their ability to reliably and economically provide diverse special services to subscribers, it is likely that most presently existing step-by-step systems will some day be replaced by electronic systems. It would, however, be economically impractical for the telephone companies to engage in a wholesale and rapid changeover to electronic systems since many existing step-by-step systems have significant remaining useful lifetimes. Additionally, many of the geographical areas now served by step-by-step systems have subscriber densities that are too low to justify the expense of a replacement. As a result, it is the general opinion of knowledgeable telephone people that a changeover to an essentially all electronic switching network will not occur for at least a few decades. It is evident that, in the meantime, unless practical, economical and flexible add-ons are developed for augmenting the capabilities of step-by-step offices, subscribers connected to such offices will be deprived of the special services and other advantageous features provided by modern electronic systems.

Special services add-ons for step-by-step switching offices have been proposed heretofore. See, for example, U.S. Pat. Nos. 3,626,107; 3,710,033; and 3,997,731. The add-ons disclosed in the cited patents are disadvantaged, however, because each is capable of providing at best only two special services, e.g., incoming call waiting and call conferencing. The disclosed add-ons are further disadvantaged in that each requires rather involved modifications and equipment additions to the telephone switching office for its implementation. The add-ons require, for example, the addition of an auxiliary line circuit for each subscriber who is to receive a special service and/or the addition of a second and separate line appearance for each such subscriber line in either the linefinder equipment or connector equipment or both of the office. The noted disadvantages of these prior add-ons and others like them have militated against their widespread use and acceptance.

A system capable of providing a variety of special services to subscribers served by step-by-step and other non-program controlled switching offices is disclosed in U.S. Pat. No. 3,546,393. That system, however, is not in the form of an add-on to conventional office, but rather involves the use of a full scale, supervisory switching office which is shared by a plurality of conventional offices and which, in turn, is operated under the control of a separate stored program switching office (TSPS center). The system is thus large scale and expensive, and its cost may be justified only if a sufficiently large number of conventional offices are served thereby.

U.S. Pat. No. Re28,337 discloses a program controlled, special services add-on for a telephone switching system that is capable of providing a variety of special services. The add-on is, however, specifically adapted for use with a common control telephone switching office. It is not applicable to direct, progressive type dial pulse actuated switching offices.

There thus exists a real need in telephony for an economical, practical and flexible special services add-on specifically adapted for use with dial pulse actuated switching offices.

OBJECTS OF THE INVENTION

It is, therefore, a primary object of the present invention to provide an improved add-on for a dial pulse actuated telephone switching office that enables the office to provide its subscribers with a variety of modern special services.

Another object of the invention is to provide an improved special services add-on of the type described that enables the switching office to supply most, if not all or more, of the special services presently supplied by modern day program controlled switching offices.

Another object of the invention is to provide an improved special services add-on of the type described that enables the variety of special services to be supplied in any combination on a subscriber-by-subscriber basis.

Another object of the invention is to provide an improved special services add-on of the type described that interfaces at the main distribution frame of the switching office and that requires no other modifications or additions to the office.

Another object of the invention is to provide an improved special services add-on of the type described that is processor based and program controlled thereby combining reliability and efficiency of components and operation with the flexibility of a changeable control program and memory.

Another object of the invention is to provide an improved special services add-on of the type described that is remotely controllable by the subscriber by dialing programming instructions either from his own or another telephone subset.

Another object of the invention is to provide an improved special services add-on of the type described that is to a major extent self diagnostic thereby simplifying and reducing maintenance time and effort.

Still another object of the invention is to provide an improved special services add-on of the type described that, in the event of power or component failure, saves critical subscriber data and does not deprive the subscriber of basic telephone service.

Other objects of the invention will, in part, be obvious and will, in part, appear hereinafter.

SUMMARY OF THE INVENTION

Briefly, a special services add-on embodied in accordance with the present invention interconnects at the main distribution frame of a dial pulse actuated telephone switching office between the subscriber line appearance and the office switching equipment. A separate such connection is made to each subscriber line that is to be provided a special service. The add-on is otherwise self-contained. All monitoring and switching necessary to implement the special services provided by the add-on is accomplished by subscriber line circuits within the add-on under the control of a central, program controlled processor. The control program, data corresponding to each subscriber's identity and class of service and data corresponding to instructions provided by subscribers are stored in an multi-part memory system in the add-on.

The add-on is adapted to provide the following special services:
 (a) incoming call alert;
 (b) call conferencing;
 (c) call forwarding;
 (d) tone dialing;
 (e) abbreviated dialing;
 (f) instant recall;
 (g) restricted calling;
 (h) ringback;
 (i) delayed ringback; and
 (j) ring disable.

The named services may be provided in any combination to any subscriber connected to the office. There is no need that all subscribers connected to the office receive any one of the services.

Additionally, various of the services provided by the add-on are controllable by the subscriber. In call forwarding, for example, the subscriber may, by dialing special programming instructions either from his own telephone subset or from another remote subset, program the add-on to automatically forward all incoming calls placed to his subset to another forwarding number, and subsequently delete or change the forwarding instructions. As a further example, in restricted calling, the subscriber may, by dialing special instructions either from his own or another telephone subset, program the add-on to impose restrictions on outgoing calls from his subset, and subsequently delete or change those restrictions. One form of restriction that may be imposed by the subscriber is to limit all outgoing calls to those numbers which have previously been stored by the subscriber in his abbreviated dialing repertoire. The subscriber is thus provided with means for readily and directly controlling his contracted-for service, which contributes significantly to the attractiveness and saleability of the service.

Tone receivers are included in the add-on to sense tone signals generated by subscribers who have contracted for the tone dialing service and to convert the tone signals to logic signals compatible with the processor. In accordance with a specific feature of the invention, only a limited number of tone receivers are required and thus utilized in the add-on, as the receivers are assigned in the processor to the individual subscriber line circuits on an as-needed basis through a multiplex circuit. The multiplex circuit illustratively utilizes pulse amplitude modulation time division multiplexing to connect the receivers to the line circuits requiring service.

In accordance with another specific feature of the invention, the high data transfer speed components of the add-on, such as the processor, memory system and associated hardware, are closely grouped and isolated from the distributed lower data transfer speed interface components of the add-on, such as the subscriber line circuits and tone receivers, by RC filtered, time shared buffer memories. Both the high speed components and the low speed components are operated in synchronized scans. The processor reads circuit data from and writes commands to the buffer memories via a high speed bus at a very low duty cycle. The slower interface components then read these commands from and store circuit data in the buffer memories at the same scan rate, but at a much higher duty cycle via a low speed bus. A similar but separate buffer memory arrangement is utilized by the processor in assigning available tone receivers to the line circuits through the multiplex circuit.

As a result of this buffered configuration, noise corruption of data on the high speed bus, which data is crucial to the proper execution of the control program, is minimized because the physical length of the high speed bus is minimized and because the high speed bus is well isolated from the low speed bus by the buffer memories. The majority of the noise pick-up, crosstalk and other signal degradation is confined to the low speed bus which couples to each of the distributed interface components and thus has the greater physical length. However, maximum filtering for noise immunity is enabled on the low speed bus, as it is operated no faster than the data transfer rate thereon. The low speed operation of the interface components also permits automatic data refresh in the event that a line circuit loses its latched data and the use of CMOS logic in the interface components which inherently has lower power consumption and increased noise and crosstalk immunity as compared to other logic systems. All of these factors contribute to the ability of the add-on to function efficiently and reliably in the electromagnetically noisy environment that is so characteristic of dial pulse actuated telephone switching offices.

BRIEF DESCRIPTION OF THE DRAWING

The foregoing and other objects, features and advantages of the invention will be better understood from the following detailed description taken in conjunction with the accompanying drawing in which:

FIG. 2 is a table setting forth illustrative dial instructions of the type that may be provided by a subscriber to program the special services add-on of FIG. 1;

DETAILED DESCRIPTION OF AN ILLUSTRATIVE EMBODIMENT

1. Description of the Environment of Use

Figure 1:
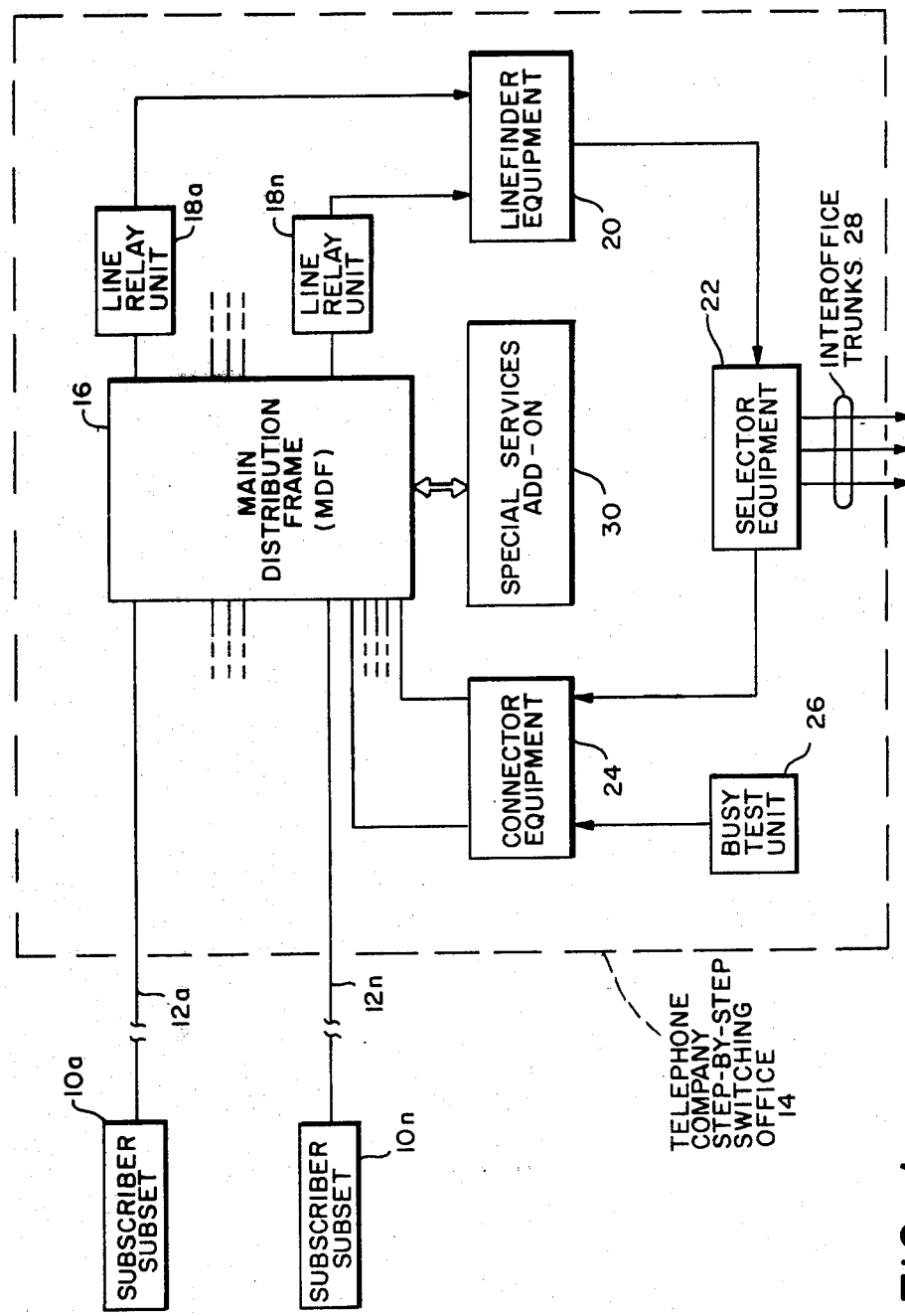
FIG. 1 is a simplified, block diagrammatic illustration of a subscriber telephone system including a step-by-step switching office that is equipped with a special services add-on embodied in accordance with the invention.

Referring now specifically to the drawing, and initially to FIG. 1 thereof, there is shown, in simplified block diagrammatic form, a subscriber telephone system which includes various local subscriber subsets 10a through 10n connected by a corresponding number of subscriber lines 12a through 12n to a dial pulse activated telephone company switching office 14 of the step-by-step variety. With the exception of the special services add-on 30 shown in FIG. 1 which is embodied in accordance with this invention, the step-by-step switching office 14 is illustratively of conventional construction.

Generally, within the office 14, the subscriber lines 12a through 12n connect to a main distribution frame (MDF) 16 from which they are connected or "distributed" to the office switching equipment. Each subscriber line 12a through 12n has a line relay unit 18a through 18n associated therewith which operates when its corresponding subset 10a through 10n goes "off-hook". The operation of the line relay units 18a through 18n provides the first indication to the office switching equipment that a call is about to be initiated by a subscriber.

Linefinder equipment 20 hunts for and locates each line relay unit 18n that is operated and connects the unit 18n to office selector equipment 22. In this way, the subscriber's line 12n is extended to the selector equipment 22 and the office 14 is readied to receive and respond to subscriber dialing. When seized by the linefinder equipment 20, the selector equipment 22 signals the subscriber that dialing may commence by transmitting a dial tone to the subscriber's subset 10n.

When the subscriber commences dialing, a dial pulse train is generated in a known manner at his subset 10n for each digit in the dialed number. The number of pulses in each train is indicative of the value of each digit. The dial pulses are transmitted over the subscriber line 12n to the selector equipment 22. The selector equipment 22 includes groups or stages of stepping switches which are actuated directly and in succession by the dial pulses in establishing the connection through the office 14 necessary to access the called line. For example, for an intra-office call, there may be a first stepping switch in a first selection stage of the equipment 22 that is advanced to a particular position determined by the dial pulses of the thousands digit dialed by the subscriber and that then hunts for and connects to a second stepping switch in a second selection stage of the equipment 22. The second stepping switch is advanced to a position determined by the dial pulses of the hundreds digit and then hunts for and establishes a connection to office connector equipment 24.

The connector equipment 24 is similar to the selector equipment 22 in that it is comprised of stepping switch stages, but is adapted to respond to the last two digits, the tens and units digits, in the dialed number and thereby to complete the connection to the called line. Once the connection to the called line is made, a busy-test unit 26 tests the line to determine whether it is idle or busy. If the line is idle, the unit 26 applies ringing current to the line. If the line is busy, a busy tone is sent back to the calling subscriber. After the subscriber goes back "on-hook", all switches in the office equipment involved in the call attempt are automatically released and idled for future calls.

The selector equipment 22 is typically also adapted to establish connections between the linefinder equipment 20 and inter-office trunks 28 for outgoing calls to other central offices and for establishing connections through the connector equipment 24 to local called lines for incoming calls received from other central offices over trunks 28.

For a more detailed explanation of the construction and operation of a typical step-by-step switching office of the type shown as office 14 in FIG. 1, reference may be made to the book entitled "Basic Telephone Switching Systems" by David Talley, Hayden Book Company, Inc. (1969).

The special services add-on 30 of the invention is adapted to augment the basic switching functions and capabilities of the office 14 by enabling it to provide subscribers connected thereto with various special services that the office 14 can not, by itself, provide. As indicated in FIG. 1, the add-on 30 interfaces with the office 14 at the MDF 16, but is otherwise self-contained. Basic call switching is performed as heretofore described by the existing switching equipment within the office 14. However, all special monitoring, processing and switching necessary to implement the special services is performed by components within the add-on 30 itself.

2. Special Services Description and General Operation

The special services provided by the add-on 30 include:
 (a) incoming call alert;
 (b) call conferencing;
 (c) call forwarding;
 (d) tone dialing;
 (e) abbreviated dialing;
 (f) instant recall;
 (g) restricted calling;
 (h) ringback;
 (i) delayed ringback; and
 (j) ring disable.
Each of the services listed may be supplied in any combination to any subscriber served by the office 14.

A subscriber generated command signal that is frequently used to initiate action by the add-on 30 is the so-called "hookswitch flash". A hookswitch flash is illustratively accomplished by momentarily depressing the hookswitch of a telephone subset 10n for a period greater than about 80 milliseconds but less than about one second. The add-on 30 is adapted to respond to hookswitch depressions of such duration at various stages of its operation and to initiate action in response thereto. An average user performs the flashing operation in about 600 milliseconds, thus the limits provide a reasonably broad tolerance for error.

Subscribers who contract for and receive the above named services are provided with the corresponding capabilities described hereinbelow.

2a. Incoming Call Alert

If, during the course of an outgoing call by the subscriber, a second, incoming call is received in the office 14 for the subscriber's subset 10n, the add-on 30 inhibits the return of a busy signal to the incoming caller and notifies the subscriber of the incoming call by sending a short tone burst to his subset 10n. The subscriber may place the first call on hold and answer the incoming call by executing a hookswitch flash. A second hookswitch flash returns the subscriber to his initial connection and places the incoming call on hold. Successive hookswitch flashes permit the subscriber to alternate between the two calls. An on-hook imposed by the subscriber for greater than one second drops the active connection independent of the held connection at the time. If the subscriber has failed to notice or disregards the tone burst and goes on-hook while the incoming caller is trying to reach him, his subset 10n will ring and the subscriber can answer the incoming call in the normal manner. Since this service applies to outgoing calls only, the subscriber cannot inadvertently leave a call on hold. The add-on 30 provides, at the option of the subscriber, program material, such as music, to the party on hold. The incoming call alert service may be enabled and disabled by the subscriber by dialing a special instruction to the add-on 30 from his own subset 10n or from any other telephone subset.

2b. Call Conferencing

If, during the course of an incoming call, the subscriber executes a hookswitch flash, the add-on 30 places the incoming call on hold and permits the subscriber to seize the linefinder equipment 20 in the office 14 so that a second, outgoing call to a third party can be made by him. The subscriber may simply consult with the called third party while the original caller is maintained on hold and then terminate the outgoing call and return to the original caller by providing an on-hook longer than one second. Alternatively, prior to terminating the outgoing call, the subscriber may execute a hookswitch flash which returns the original calling party to the conversation in a conferencing arrangement. Again, at the option of the subscriber, the add-on 30 may provide music to the party on hold while the third party is being consulted.

2c. Call Forwarding

The subscriber may dial a special instruction to the add-on 30 which enables the call forwarding service and which includes a forwarding telephone number. With this service in effect, the subscriber's subset 10n rings approximately twice during an incoming call. If the call is not answered, the add-on 30 automatically forwards the call to the forwarding number. The forwarding continues for each incoming call until the subscriber dials an additional instruction to change the forwarding number or disable the service. As with all other subscriber controlled services, the forwarding service may be controlled by the subscriber from either his own subset 10n or from any other telephone subset equipped for tone dialing. Calls may be forwarded both to local numbers and to toll numbers. Also, as with all services provided by the add-on 30, the subscriber has preemptive control. If the subscriber goes off-hook during the initial ringing, he is connected to the incoming call and the call forwarding process is aborted. If the subscriber attempts to place a call after forwarding has been completed, he will join the forwarded conversation in a conferencing arrangement and assume supervisory control over the connection.

2d. Tone Dialing

The add-on 30 recognizes dual tone, multifrequency dial signals on the subscriber's line 12n and converts the tone dial signals to dial pulsing to which the switching equipment in the office 14 can respond. If the tone dialing service is enabled for a subscriber line 12n, either a dial pulse subset or tone dialing subset may be used by the subscriber.

2e. Abbreviated Dialing

By dialing special instructions to the add-on 30, the subscriber may store up to eight telephone numbers (each up to 12 digits long) for use in an abbreviated dialing mode. If the subscriber thereafter dials one digit (1 through 8) followed by a hookswitch flash, the add-on 30 will institute a call to the telephone number stored in the subscriber's repertoire at the location corresponding to the dialed digit. The subscriber may change the content of his repertoire at any time by dialing the appropriate instructions and information from any telephone subset to the add-on 30.

2f. Instant Recall

By instituting a hookswitch flash immediately after going off-hook, the add-on 30 will dial the digits of the last telephone number entered from the subscriber's subset 10n, regardless of the reason for entering that number. Outgoing calls to telephone numbers which are busy may be retried any number of times without the need for redialing the number. The abbreviated dialing repertoire and forwarding instructions can be checked by the subscriber for proper loading using this service.

2g. Restricted Calling

By dialing a special instruction to the add-on 30, the subscriber may implement either one of two forms of restriction on outgoing calls attempted from his subset 10n. In the first form of restriction, the add-on 30 permits incoming calls to be received and local outgoing calls to be made but prevents access to the toll network. If an attempt is made to dial either "1" or "0" as the first digit of an outgoing call, an error tone is returned to the subset 10n and the attempted call is prevented.

In the second form of restriction, the add-on permits incoming calls to be received but prevents all outgoing calls. If an attempt is made to dial either locally or over the toll network, an error tone is returned to the subset 10n and the call is prevented. If the subscriber has contracted for the abbreviated dialing service, however, it is possible to institute an outgoing call to any one of the numbers held in the subscriber's abbreviated dialing repertoire by dialing a single digit followed by a hookswitch flash as described above. In this way, individuals are prevented from placing arbitrary outgoing calls from the subscriber's subset 10n, but permitted to place calls to emergency numbers and other selected numbers that have been previously loaded into the subscriber's repertoire.

2h. Ringback

If the subscriber dials a special instruction and then goes on-hook, the add-on 30 will institute a call back to the subscriber's line 12n. The subscriber may use the ringback service to place a "call" to another telephone subset extension on his premises. When the extension "answers" in this mode, a short tone burst is provided to indicate to the answering party that the call is a ringback. The subscriber initiating the ringback waits until ringing ceases before again going off-hook so as to communicate with the answering extension.

2i. Delayed Ringback

Delayed ringback is implemented in the same manner as the ringback operation but a time of day is entered as part of the special instruction before going on-hook. The ringback call will then be placed by the add-on 30 at the time of day specified by the subscriber. This service may thus be utilized, for example, to initiate "wake-up" calls to the subscriber's premises. During a ringback call, the subscriber's line will ring for an interval of approximately 30 seconds, after which, if an off-hook is not sensed, the call attempt is abandoned. If the add-on 30 encounters a busy condition, the ringback call is also abandoned. If the add-on 30 encounters office blocking, the ringback call will be dropped and retried after a few second delay. Three retries are made by the add-on 30 before the ringback call is abandoned. Successful completion or abandonment clears the ringback instruction, assuring that an erroneous attempt will not be made at a later time.

2j. Ring Disable

By dialing the appropriate instruction to the add-on 30, the subscriber may cause the add-on 30 to inhibit ringing at his subset 10n for a period of time determined by a time of day that is entered as part of the instruction. From the time of the instruction to the entered time of day, the subscriber's subset 10n is silenced. When the entered time of day is reached, the add-on 30 automatically places a call to the subscriber subset 10n to notify him that the silence period has terminated. The silence period may be terminated in advance of the entered time of day by dialing a "clear" instruction to the add-on 30.

3. Subscriber Programming

The special instructions that are dialed by the subscriber to the add-on 30 in connection with various of the services described above are illustratively preset digit strings that are disclosed to those subscribers contracting for the services. FIG. 2 sets forth in tabular form illustrative examples of subscriber supplied instructions that are dialed from the subscriber's own subset 10n to program the add-on 30 to control various of the listed services.

As indicated in FIG. 2, each instruction is preceded by a program code which the add-on 30 is programmed to sense and recognize as an indication that special instructions are to follow. The program code may, for example, be a simple two digit sequence (e.g., 2-3), which sequence is not the same as the first two digits dialed in normal calling from the office 14 in which the add-on 30 is installed. The same program code may be used for all subscribers connected to the office 14.

The program code is in each case followed by a two-digit command code which is indicative of the actual operation to be performed by the add-on 30. For example, in the incoming call alert service, the command code "9-1" tells the add-on 30 that the incoming call alert service is to be enabled for the instructing subscriber's line 12n, while the command code "9-0" tells the add-on 30 that the incoming call alert service is to be disabled. Similar two-digit command codes are included for each instruction.

For certain instructions, a subscriber identification code is required to minimize the chance of an unauthorized person making service changes. The identification code may comprise a two or more digit number which is selected at the time service to the subscriber is initiated and may be changed as necessary to maintain security.

As indicated in FIG. 2, in initiating the call forwarding service, the subscriber must enter, after his identification code, the telephone number to which incoming calls are to be forwarded. The forwarding number may contain up to 12 digits.

The instruction specified in FIG. 2 for the abbreviated dialing service is that which enables the subscriber to load a telephone number, or change the number previously loaded, into one of the eight locations of his repertoire. The "memory number" that is dialed represents the particular repertoire location and may have a value anywhere from "1" to "8". Each telephone number in the repertoire may contain up to 12 digits.

The final step in each of the instructions listed in FIG. 2 is an on-hook by the subscriber. If, in the call forwarding instruction, the on-hook is preceded by a hookswitch flash, the add-on 30 will automatically dial the forwarding number just entered by the subscriber. Similarly, in the abbreviated dialing instruction, if the on-hook is preceded by a hookswitch flash, the add-on 30 will automatically dial the telephone number in the repertoire location that was just changed by the instruction. The subscriber may in this manner test each number as it is loaded.

As noted previously, programming instructions may be entered from telephone subsets other than the subscriber's own subset 10n using a remote programming feature. A directory number is assigned to a remote programming port (shown and discussed more fully below) in the add-on 30 which may be dialed from any location to enable the subscriber to access the add-on 30 in a remote programming mode. After the directory number is dialed and the connection is made, the add-on 30 answers by returning a short tone burst. The remote programming feature of the add-on 30 is adapted to respond to instructions dialed from tone dial subsets only. The remote programming instructions are illustratively the same as the local programming instructions listed in FIG. 2 except for the fact that each command code must be preceded by an asterisk (which is one of the push-buttons on a conventional tone dial telephone subset) and by the subscriber's line terminal number (which identifies his line 12n in the office 14 and which is given to him when he subscribes for the special service) and terminated with an asterisk. A typical remote programming sequence for the call forwarding service is thus:

*024-31-32-2751234* where 024 is the subscriber's line terminal number, 31 is the command code to load a forwarding telephone number, 32 is the subscriber's identification code and 2751234 is the forwarding telephone number.

More than one instruction may be loaded during the course of a single call using the remote programming feature, as long as each instruction sequence is separated by an asterisk. An error in a programming instruction causes the add-on 30 to return an error tone. An asterisk dialed provides an escape from the error condition and a return to the beginning of the instruction.

4. General Description of Add-on 30

Figure 3:
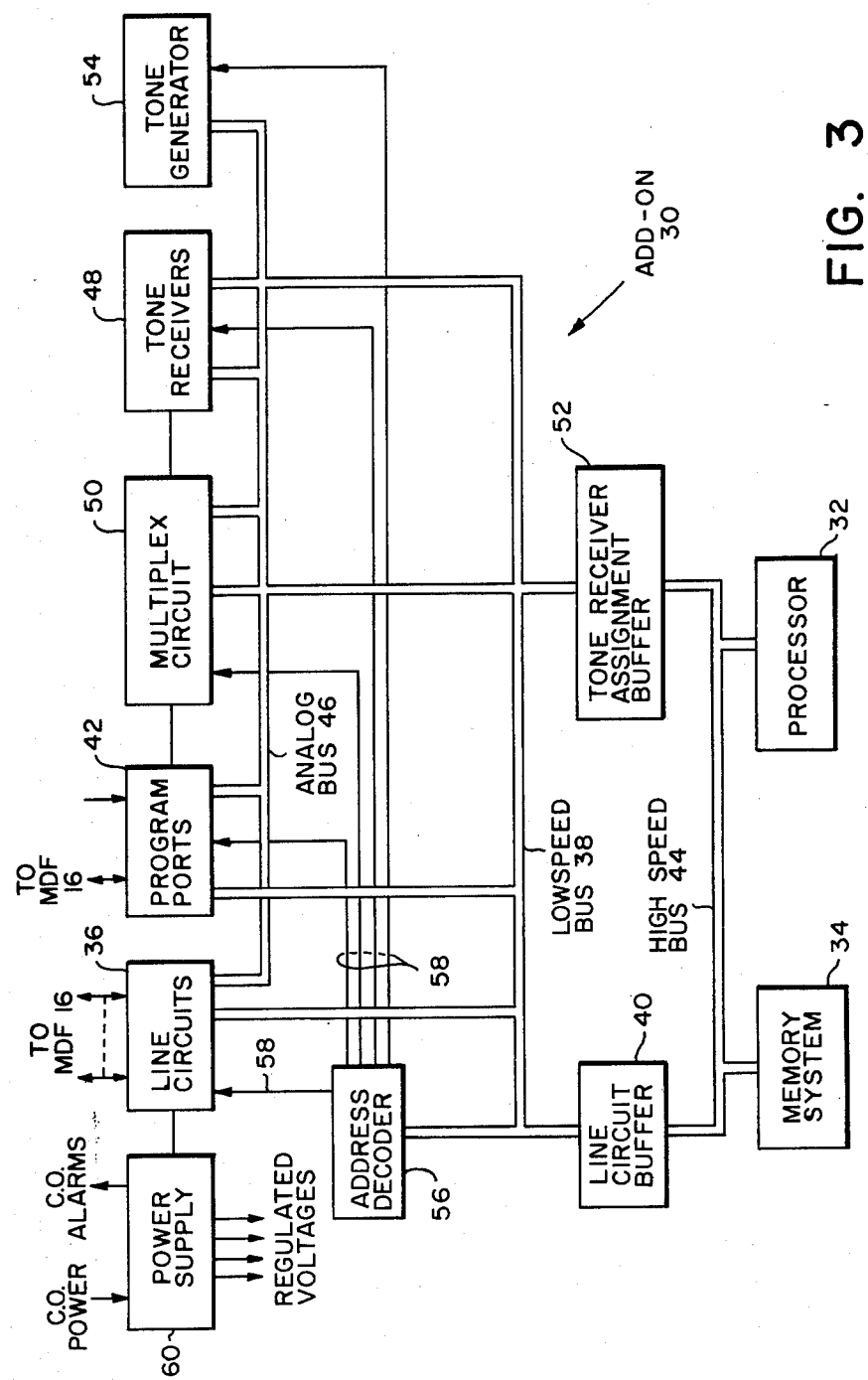
FIG. 3 is a block diagrammatic illustration of the basic components of the special services add-on of FIG. 1.

FIG. 3 of the drawing illustrates, in block diagrammatic form, the basic components and general configuration of the add-on 30. Processor 32 provides primary control and supervision over operation of the add-on 30. Memory system 34 provides storage for essential data including the add-on control program, subscriber identification and class of service data and subscriber supplied instructions. Line circuits 36 serve as the primary interface between the add-on 30 and the subscriber lines 12n (i.e., at the MDF 16 of the office 14). The line circuits 36 sense subscriber dialed instructions and other information concerning subscriber line status and feed that information over a low speed data bus 38 to a line circuit buffer 40 where the information is temporarily stored. Program ports 42 couple to the MDF 16 to receive remote programming calls and also enable telephone company personnel at the office 14 to supply programming instructions as well as subscriber identification and class of service information to the add-on 30. The information received at the program ports 42 is also fed to the buffer 40 over the low speed bus 38. Processor 32 reads the stored information from, and writes corresponding commands to, the buffer 40 over a high speed data bus 44. The line circuits 36, in turn, read the processor commands from the buffer 40 and, in response thereto, perform all special switching necessary to implement the commands.

Tone dial signals received from the subscriber lines 12n through the line circuits 36 or received through the program ports 42 are multiplexed onto an analog bus 46 for conversion by tone receivers 48. A multiplex circuit 50 assigns individual tone receivers 48 to the line circuits 36 and program ports 42 on an as-needed basis under the control of the processor 32. Assignment data is fed by the processor 32 over the high speed bus 44 to a tone receiver assignment buffer 52 which is similar to the line circuit buffer 40 previously described. The assignment data is read from the buffer 52 by the multiplex circuit 50 over the low speed bus 38. The multiplex circuit 50 illustratively utilizes pulse amplitude modulation (PAM) time division multiplexing in assigning the tone receivers 48 to the line circuits 36 and program ports 42 requiring service. This multiplexed assignment arrangement allows sharing of a limited number of tone receivers 48 (e.g., 12) among a considerably larger number of line circuits 36 and program port 42 connections (e.g., greater than 100).

The tone receivers 48 accept the tone signals received on the analog bus 46 and convert the tone signals to logic signals compatible with the processor 32. The logic signals, like the subscriber line status and identification information, are coupled onto the low speed bus 38 and stored in the line circuit buffer 40. Processor 32 reads the logic signals from, and writes corresponding commands to, the buffer 40. If the logic signals correspond to dial signals, the line circuits 36 read the corresponding commands from the buffer 40 and generate dial pulse trains to operate the dial pulse actuated switching equipment in the office 14.

Tone signals are generated internally of the add-on 30 by tone generator 54 and coupled onto the analog bus 46 which circulates to the line circuits 36, the program ports 42 and the tone receivers 48. The internally generated tone signals are used as test signals within the add-on 30 in self-testing routines and also as response signals to subscribers who access the add-on 30 (e.g., as error tones, incoming call alert tones, subscriber programming progress tones and the like).

The processor 32 treats all peripheral components (e.g., the line circuits 36, the program ports 42, the multiplex circuit 50, the tone receivers 48 and the tone generator 54) as addressable memory locations. Address information is decoded from the low speed bus 38 by an address decoder 56 which correspondingly addresses and activates individual components via select lines 58.

The add-on 30 is designed to be powered by the central office batteries. Central office battery power is supplied through fused and noise filtered contacts to a power supply 60 which develops various regulated voltages for the add-on 30 components. The supply 60 may also be adapted to actuate central office alarms in the event of the occurence of various alarm conditions such as power supply failure, processor failure and the like.

Normally, the control of a multitude of separate peripheral components by a central processor, as in the case of the add-on 30, forces some difficult trade-offs between data transfer rates, processing speeds, noise immunity and bus lengths. This problem can be particularly acute in the electromagnetically noisy environment of the step-by-step telephone switching office 14. The large number of peripheral components in the add-on 30 makes use of a multiplexed bus to connect them to the processor 32 a practical necessity. Additionally, most processor designs are based upon the use of such a bus, and it is natural to seek to extend the bus from the processor 32 directly to each of the peripheral components. There are, however, a number of problems that would result from such a direct connecting bus configuration.

For example, the data transfer rate to and from the processor 32 is preferably very high so as to maximize processing throughput and efficiency. To accommodate such a high data transfer rate, the actual bandwidth of the connecting bus must be rather broad. The data transfer rate of the peripheral components, on the other hand, is inherently relatively low. Even with the relatively large number of peripheral components in the add-on 30, the peripheral component data on the connecting bus would represent only a very small fraction of the processor data on the bus at any given time.

Additionally, in such a direct bus configuration, the extension of the bus to each of the distributed peripheral components would be responsible for the majority of the physical bus length and, consequently, the majority of noise pickup, crosstalk and other signal degradation. While noise corruption of peripheral component data may be tolerated to a certain extent, noise corruption of the processor data on the bus, which is crucial to the execution of the control program, would seriously interfere with the proper operation of the add-on 30. Noise pickup can be minimized either by electromagnetically shielding the bus or by incorporating suitable noise filters therein. Bus shielding, however, would be impractical due to the long physical length of the bus, while filtering is not possible since the broad bus bandwidth required by the high processor data transfer rate would be greater than the bandwidth of the noise of concern.

The above problems are greatly alleviated by the two speed, buffered configuration of the add-on 30 of FIG. 3. In the add-on 30, the processor 32 is isolated from the distributed periperal components thereof by buffers 40 and 52. Both the processor 12 and the peripheral components of the add-on 30 operate in synchronized scans. The processor 32, however, reads data from, and writes commands to, the buffers 40 and 52 via the high speed bus 44 at a very high data transfer rate and very low duty cycle. The peripheral components, on the other hand, read processor commands from, and store data in, the buffers 40 and 52 at the same scan rate, but at a considerably slower data transfer rate and considerably higher duty cycle via the low speed bus 38.

Noise pickup on the high speed bus 44 of the add-on 30 is minimized since the physical length of the bus 44 is minimized and since the bus 44 is well isolated from the physically longer low speed bus 38 by the buffers 40 and 52. Noise pickup on the low speed bus 38 may be minimized by incorporating suitable filters in each of the input lines of the bus 38. Filtering is feasible on the bus 38 as its data transfer rate is slow and its corresponding bandwidth smaller than that of the noise of concern.

Another advantage resulting from the relatively low speed operation of the peripheral components in the add-on 30 is that it permits the automatic refresh of latched data in the line circuits 36 in the event that one of the line circuits 36 loses its data due to a malfunction or other problem. Additionally, it permits the use of lower speed CMOS logic in the peripheral components, which logic inherently has lower power consumption and increased noise and crosstalk immunity as compared to other higher speed logic systems.

5. Detailed Description of the Add-on 30

Figure 4:
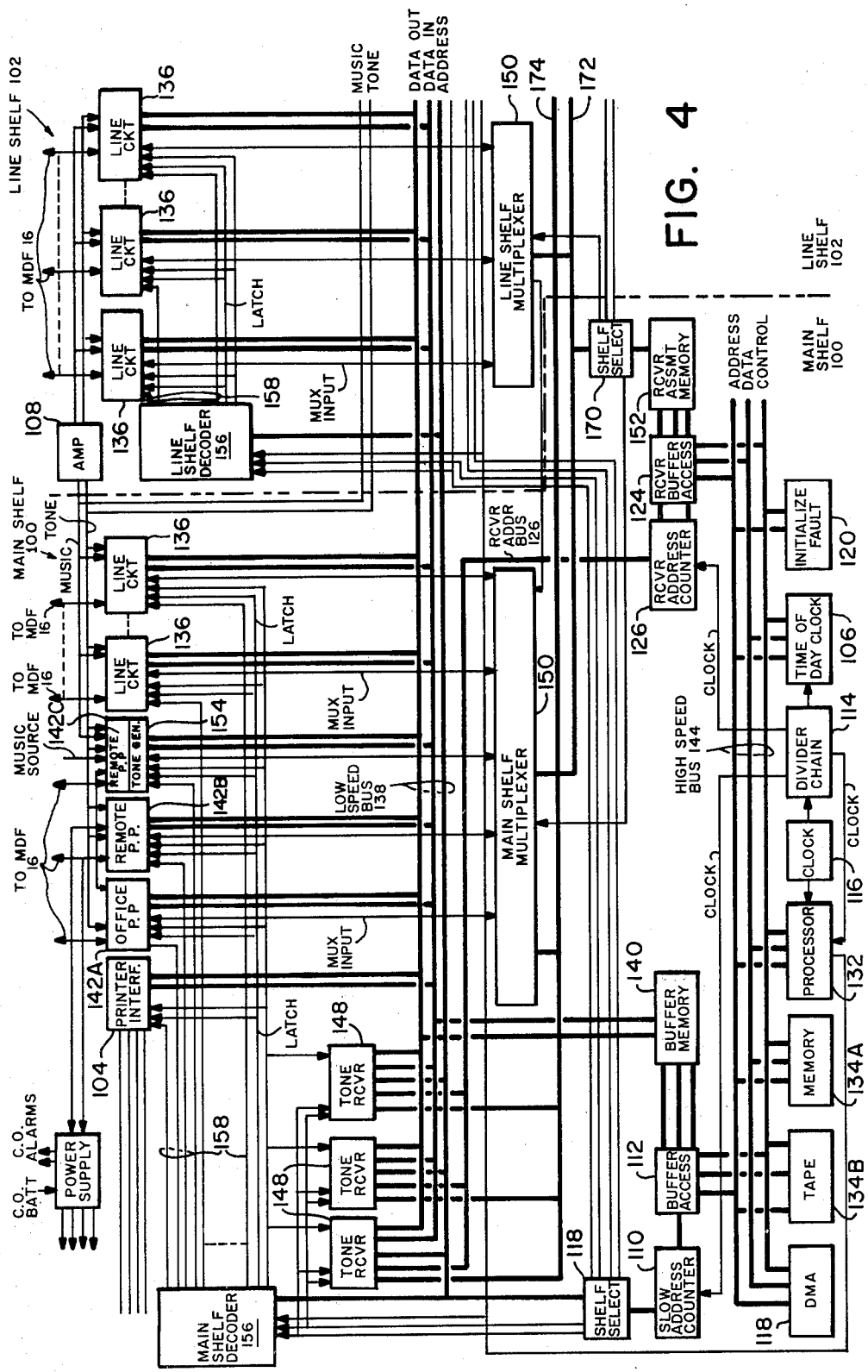
FIG. 4 is a detailed internal block diagrammatic illustration of the add-on of FIG. 1.

FIG. 4 is a detailed internal block diagram of the add-on 30 showing the major components thereof together with all major data, address and control buses. The components of FIG. 4 are referenced by numerals 100 units higher than those to which they correspond in generalized block diagram of FIG. 3.

The add-on 30 is divided into a main shelf 100, shown on the left side of FIG. 4, and various line shelves, one of which is shown as line shelf 102 at the right side of FIG. 4. The main shelf 100 includes all of the basic components discussed above in connection with FIG. 3, including a predetermined number (e.g., 15) of line circuits 136 which are connected to and serve a corresponding number of subscriber lines 12n. Each line shelf 102 includes an additional number (e.g., 30) of line circuits 136 which are connected to and serve additional subscriber lines 12n. The number of line shelves 102 included in the add-on 30 is determined by the total number of subscriber lines 12n to be served in the office 14. For example, one main shelf 100 and three lines shelves 102 are capable of serving a total of 105 subscriber lines 12n. Additional line shelves 102 may be added on an as-needed basis.

Figure 5:
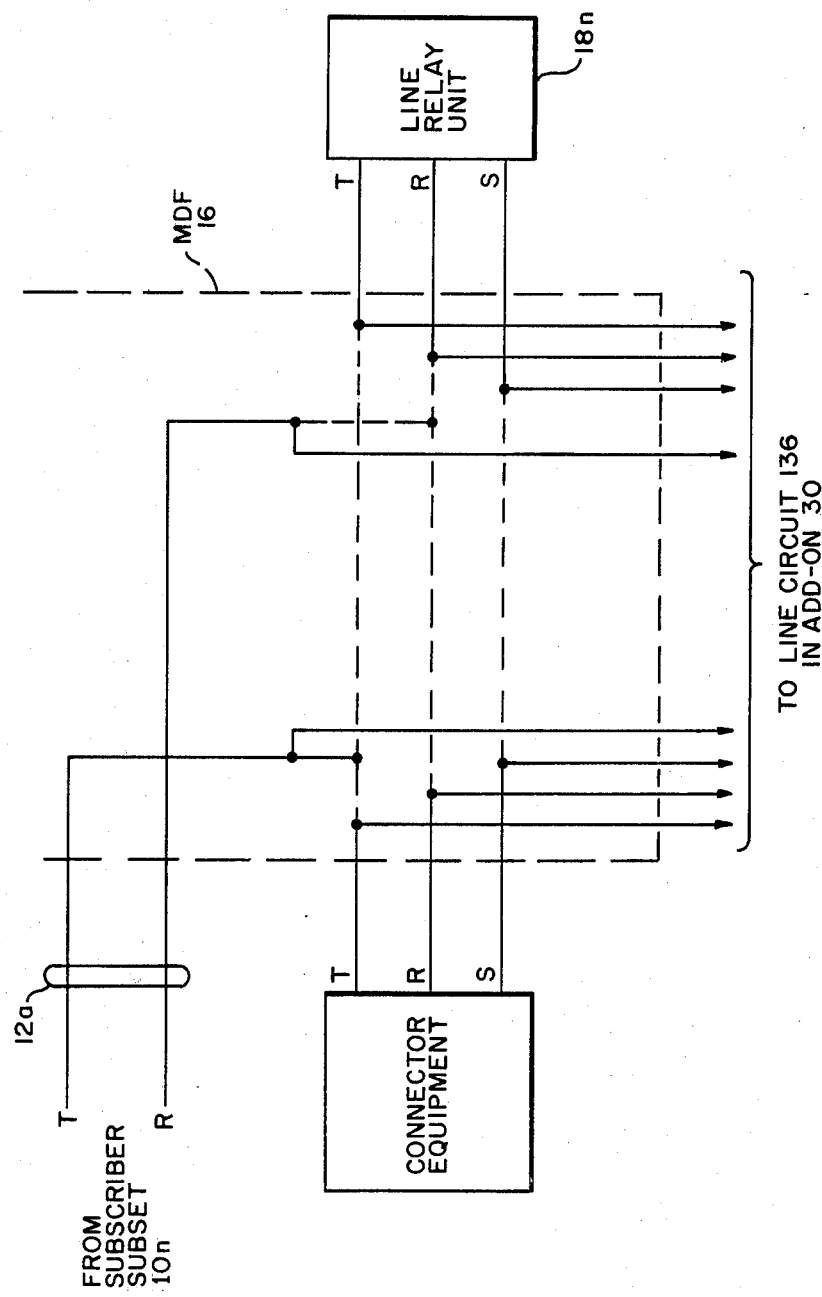
FIG. 5 illustrates the interconnection of the add-on of FIG. 1 to a subscriber line at the main distribution frame of the switching office.

Separate connections are made from each line circuit 136 to its associated subscriber line 12n, the office line equipment and connector appearance at the MDF 16 in the office 14. FIG. 5 illustrates the specific manner of interconnection to each line circuit 136. Normally, the subscriber line 12n, which consists of a tip (T) and ring (R) lead, is connected at the MDF 16 to T and R leads extending to the subscriber's line relay unit 18n and to the office connector equipment 24. A sleeve (S) lead also extends between the subscriber's line relay unit 18n and the connector equipment 24.

To connect the add-on 30, the normal connections indicated by the dashed lines in FIG. 5 are broken or removed, while the T and R leads of the subscriber line 12n and the T, R and S leads of both of the connector circuit and the line relay circuit are extended, as by eight jumper wires, to connections within the line circuit 136. Each line circuit 136 includes a relay switching network (shown and described more fully below), which is operated under the control of processor 132, for establishing connections between the line relay circuit, the connector circuit and the subscriber line 12n, with terminations, battery/ground feeds, and various other components of the add-on 30 as is required in each case to implement the special services. Each line circuit 136 is also equipped with sensors that detect status of the subscriber line 12n and of the office equipment. All decisions concerning action required by the relay switching network in the line circuit 136 are made by the processor 132 based upon the status of the line circuit sensors.

As indicated in FIG. 4, the add-on 30 also includes an office program port 142A and two remote program ports 142B and 142C. The office program port 142A is an internally powered, dedicated loop for use by telephone company personnel in supplying programming instructions and data to the add-on 30. Using the office program port 142A, data such as the add-on program code, subscriber line assignments, directory numbers, identification codes and class of service data are entered initially and updated as new subscribers are added or classes of service are changed. Command codes may also be entered through the port 142A to initiate a "dump" of current subscriber assignment and class of service data to a printer interface 104, to set a time of day clock 106 or to initiate various self-test routines by the processor 132. Data and commands may be entered through the port 142A using a telephone subset connected thereto at the office 14 for that purpose.

The remote program ports 142B and 142C connect to the MDF 16 in the office 14 and permit subscriber programming from locations other than the subscriber's assigned line 12n. Unlike the line circuits 136, the program ports 142B and 142C require only a connector circuit appearance (e.g., 3 jumper wires) from the MDF 16. The program ports 142B and 142C have preassigned directory numbers which enable them to be accessed from any telephone subset by an incoming call dialed to those numbers.

Tone generator 154 is, as a matter of convenience, incorporated on the same circuit card as one of the remote program ports, i.e., the port 142C. A music input is also supplied through that same port 142C. The tone generator 154 is coupled to each line circuit 136 and to each program port 142A, B and C in the main shelf 100, and through amplifier 108, to each line circuit 136 in the line shelf 102, over a TONE line, which forms part of the analog bus 46 discussed above in connection with FIG. 3. The music is also supplied to each line circuit 136 in the main shelf 100 and, through amplifier 108, to each line circuit 136 in the line shelf 102, over a MUSIC line.

The line circuits 136, program ports 142A, B and C, tone generator 154, printer interface 104 and tone receivers 148 are coupled to low speed data bus 138 which consists of a DATA IN bus, a DATA OUT bus and an ADDRESS bus. The DATA IN bus and DATA OUT bus originate in buffer memory 140 and provide a bidirectional data transfer path between the memory 140 and each of the named peripheral components. The ADDRESS bus originates in slow address counter 110.

The counter 110 determines the scan rate for the low speed bus 138 and peripheral components in the add-on 30. The counter 110 illustratively generates a 7 bit address which uniquely identifies each of the various peripheral components and which is fed through buffer access 112 to the buffer memory 140 and to the ADDRESS bus of the low speed bus 138. The counter 110 is incremented or stepped sequentially from address to address under the control of a CLOCK input from a divider chain 114 driven by crystal clock 116. The crystal clock 116 illustratively operates at a 4 megahertz rate, with the CLOCK input divided down to 32 kilohertz. The counter 110 thus selects a new address approximately once every 32 microseconds. The peripheral components in the add-on 30 are in turn addressed, or scanned through, at about a 4 millisecond scan rate.

Shelf select unit 118 and shelf decoders 156 decode the address appearing on the ADDRESS bus and activate the appropriate one of the plurality of select lines 158 that has been addressed. Each select line 158 enables a single peripheral component. The shelf select unit 118 decodes the two most significant bits of the 7 bit address and enables the appropriate one of the shelf decoders 156. The enabled shelf decoder 156 demultiplexes the lower five address bits and enables 1 of 32 possible components on the associated shelf.

As noted, the address counter 110 selects a new address at approximately 32 microsecond intervals. The appropriate shelf decoder 156 activates the addressed select line 158 for about 24 microseconds out of the 32 microsecond interval. The decoder 156 also generates a delayed LATCH pulse which is coupled over a LATCH LINE to the addressed peripheral component. The LATCH pulse initiates the transfer of data from the selected peripheral component onto the DATA IN bus to the buffer memory 140 and from the buffer memory 140 onto the DATA OUT bus to the selected component. Thus, a bidirectional data transfer is made between a selected peripheral component and a corresponding location in the buffer memory 140 each 32 microseconds.

The peripheral component that has been selected is connected to the DATA in and DATA OUT buses of the low speed bus 138 in two stages. The select line input to each addressable component includes a low pass RC filter (not shown) having a time constant of approximately 2.7 microseconds. Upon activation of the select line 158, a delay approximately equal to the filter time constant must pass before the filter output crosses a logic threshold to enable data in the component to be coupled onto the DATA IN bus. A similar RC filter having a similar time constant is incorporated in the DATA IN bus at the input to the buffer memory 140. Neither the buffer memory 140 nor the selected peripheral component can latch data until it receives the delayed LATCH pulse from the decoder 156. The LATCH pulse is generated approximately 15 microseconds after the select line 158 is activated. Additionally, the LATCH LINE input to each peripheral component also includes a similar 2.7 microsecond RC filter. There is thus about an 18 microsecond delay after activation of the select line 158 before data is latched in the selected component and the buffer memory 140. This delay assures that the data at the selected component and at the buffer memory 140 is stable when latched. Additionally, 2.7 microsecond input filters assure that any extraneous pulses significantly shorter than that time are ignored.

The processor 132 is adapted to override the normal peripheral component scanning and data transfer sequence implemented by the counter 110, for very short periods of time, in order to read and write data to the buffer memory 140. As indicated in FIG. 4, the processor 132 couples to the buffer access 112 over high speed bus 144 which consists of an ADDRESS bus, a DATA bus and a CONTROL bus. When the processor 132 desires to access the memory 140, it transmits the appripriate 7 bit address over the high speed ADDRESS bus to the buffer access 112. The buffer access 112 forwards the processor originated address to the buffer memory 140 in place of the address normally forwarded to the memory 140 by the counter 110. The processor 132 thus preemptively determines which location of the memory 140 is to be accessed. The LATCH pulse to the memory 140 is disabled during this time so that input data from one of the peripheral components will not be written to the wrong address in the memory 140.

For a processor read operation, the memory 140 is enabled to transmit the data from its addressed location onto the high speed DATA bus from which it is read by the processor 132. For a processor write operation, the memory 140 is strobed by a LATCH pulse from the processor 132 for latching data coupled by the processor onto the high speed DATA bus into the addressed memory location. Each processor accessing operation takes place in only about 0.25 microseconds. The processor accessing is thus so rapid that the 2.7 microsecond filters on the low speed bus 138 do not respond and the access is not apparent on the low speed bus 138. After each processor accessing operation is completed, the buffer access 112 is returned to its normal mode to accept addresses from the counter 110.

Every 4 milliseconds, the processor 132 temporarily stops whatever it is doing and reads peripheral component status data from the buffer memory 140 and stores that data in memory 134A. At longer intervals (e.g., every 100 milliseconds), the processor 132 sends commands to the buffer memory 140 to change relay states and the like in the peripheral components and reads incoming data from those peripheral components that require less attention (e.g., the tone receivers 148). The processor LATCH pulse that latches data into the memory 140 is derived from a synchronized CLOCK signal from divider chain 114 with timing such that the LATCH pulse, after passing to a suitable time delay filter at the input to the buffer memory 140, is guaranteed to occur before signals on the low speed DATA and ADDRESS buses begin to change for the next scan step.

The processor 132 continually tests the buffer memory 140 by writing four bits to the low speed bus 138, reading them back and comparing.

Tape unit 134B provides non-volatile storage for data supplied through the orifice program port 142A (e.g., subscriber line assignments, class of service information and the like) and for subscriber supplied programming data (e.g., call forwarding numbers, abbreviated dialing numbers, and the like). The tape unit 134B illustratively comprises an on-board microcassette tape that is written to periodically under processor control (e.g., every 24 hours) or on command at any time. Thus, after an extended power failure or a catastrophic failure, the add-on 30 can automatically restore itself to the last recorded state on the tape unit 134B upon start-up.

Direct memory access (DMA) port 118 permits an external processor controlled device to monitor performance of the add-on 30, examine and alter the memory 134A and, when necessary, to run the add-on 30 from internal or external memory. The port 118 is used primarily for software modification or troubleshooting and may be used for call pattern data collection.

Initialization and fault detection circuits 120 generate "restart" pulses if the processor 132 fails to execute specific steps in its normal routines. The circuit 120 also monitors the low speed bus 138 in the main shelf 100 and each line shelf 102 to detect the presence of a breakdown in the communication path.

Time of day clock 106 provides the processor 132 with real time data for such services as delayed ringback and ring disable. The clock 106 is illustratively a four digit 24 hour clock that is driven by a CLOCK signal from divider chain 114. The clock 106 is provided with a command responsive set mechanism which enables it to be set through orifice program port 142A on start-up or after extended power failures.

Tone receivers 148 are utilized to detect dual tone, multifrequency dial signaling received through the line circuits 136 and the program ports 142A, B and C. During self-testing routines, the receivers 148 also detect tone signals applied to the line circuits 136 and program ports 142A, B and C from the tone generator 154. There are illustratively a total of 12 tone receivers 148 included in the main shelf 100.

The main shelf 100 and each line shelf 102 includes time division multiplexer circuit 150 which serves to connect the tone receivers 148 to those peripheral components in that shelf requiring service. Tone signals are picked up from the receiving components, band limited, and presented to the associated shelf multiplexer 150 over MUX INPUT lines which extend to the shelf multiplexer 150 from each receiving peripheral component in that shelf and which form part of the analog bus 46 discussed above in connection with FIG. 3. Up to 12 peripheral components in each shelf may be monitored simultaneously by sequential sampling through the multiplexer 150. The actual number of peripheral components that are simultaneously monitored depends upon the number of tone receivers 148 available at any given time.

Tone receiver assignment buffer memory 152 includes 12 eight bit memory locations, with one location corresponding each tone receiver 148 included in the add-on 30. When the processor 132 determines that a given peripheral component requires a tone receiver 148, it accesses the memory 152 at high speed through receiver buffer access unit 124 and "jams" the 7 bit address of the peripheral component requiring service into the memory location corresponding to a selected tone receiver 148. Receiver address counter 126 steps sequentially through the 12 addresses of memory 152 at a slower rate (determined by a CLOCK input from divider chain 114) and feeds the receiver address through receiver buffer access unit 124 to memory 152 and simultaneously over a receiver address bus 126 to the tone receivers 148. When the selected tone receiver 148 and its corresponding memory location are simultaneously addressed, the 7 bit address of the peripheral component requiring service appears at the output of memory 152 and is fed through a receiver shelf select unit 170 onto a multiplexer address bus 172 which extends to each shelf multiplexer 150.

The two most significant bits of the 7 bit address are decoded by the receiver shelf select unit 170 which enables the shelf multiplexer 150 in the appropriate shelf. The enabled shelf multiplexer 150, in turn, decodes the five lower bits and connects the peripheral component requiring service to a multiplexer analog bus 174 which also forms part of the analog bus 46 shown in FIG. 3. The selected tone receiver 148 is also connected to the multiplexer analog bus 174 through an internal sample and hold network. The peripheral component is sampled for approximately 4 microseconds at a sample rate of over 20 kilohertz. When the receiver address counter 126 moves to a new 8 bit address, a new tone receiver 148 and new service-requiring peripheral component are connected to the multiplexer analog bus 174.

The tone receivers 148 require multiple samples from the peripheral components over approximately 40 millisecond time periods to detect a valid tone signal. When a tone signal has been detected, the detecting tone receiver 148 raises a one bit "flag" for the processor 132 and latches a binary code corresponding to the detected tone signal onto the low speed DATA IN bus. The processor 132 reads the binary code during its next scan of the memory 140 and clears the flag. The sequence is repeated until the processor 132 determines that all required tone signals have been received (e.g., as in the case of a self-test sequence), until the subscriber signals completion (e.g., by a hookswitch flash or on-hook), or until a predetermined period of time (e.g., 10–12 seconds) passes with no new tone signals being received. The processor 132 then disconnects the tone receiver 148 from the peripheral component by "jamming" a new 7 bit address into the receiver address memory 152 and connecting the tone receiver 148 to a new peripheral component or to a quite termination (idle state).

The tone receiver assignment arrangement is non-blocking. Any tone receiver 148 can be assigned to any addressable peripheral component. All tone receivers 148 can be assigned to a single component (e.g., to tone generator 154 for test purposes) or to one or more quite terminations. Any tone receiver 148 that fails a periodic test may be taken out of service by permanent assignment to a quite termination.

The processor 132 is illustratively designed to implement a variety of self testing and self diagnostic sequences which serve to maintain the highest level of service possible with the given equipment condition, to notify telephone company repair personnel of the existence and severity of problems, and sectionalize problems to the circuit board level and indicate which boards (i.e., components) should be replaced. Continuity of service, even conventional dial pulse service, is paramount. During extended power outages or catastrophic internal failure, the add-on 30 reverts to conventional dial pulse service. Thus, even in the worst case, subscribers are never without basic service.

Continuous tests are run on the processor 132 itself, the buffer memories 140 and 152, on the main shelf 100 and on each line shelf 102 to determine whether or not the processor 132 and its communication path to each shelf is up and working. A failure in any of these continuous tests causes the processor 132 to set a major alarm and to remove central office battery power from the various control relays in the affected shelf so that the shelf reverts to conventional dial pulse service. A failure in the processor 132 or in the buffer memories 140 and 152 causes the entire add-on 30 to revert back to conventional service.

Periodic tests are run on the line circuits 136, program ports 142A, B and C, tone receivers 148 and multiplex circuit 150 in each shelf to assure that they are working properly. The processor 132 may be set to run the periodic tests at preset times of the day or immediately upon the receipt of a suitable command through the office program port 142A. Each component is illustratively equipped with a fault lamp or other indicator which is illuminated in the event that the component fails a periodic test. The fault lamps allow central office personnel readily to isolate a problem and to replace a faulty component (e.g., circuit board) with a spare to allow full service again.

Printer interface 104 allows the add-on 30 to be connected to an appropriate printer which may be located either at the office 14 or at some other remote location. Diagnostic and audit reports may be selected for printing by providing suitable commands through the office program port 142A. In the diagnostic mode, the printer may generate "trouble tickets" which complement the component fault lamps. In the audit mode, the printer may generate a hard copy of subscriber assignments, classes of services, identification codes and the like.

6. Line Circuits 136

Figure 6:
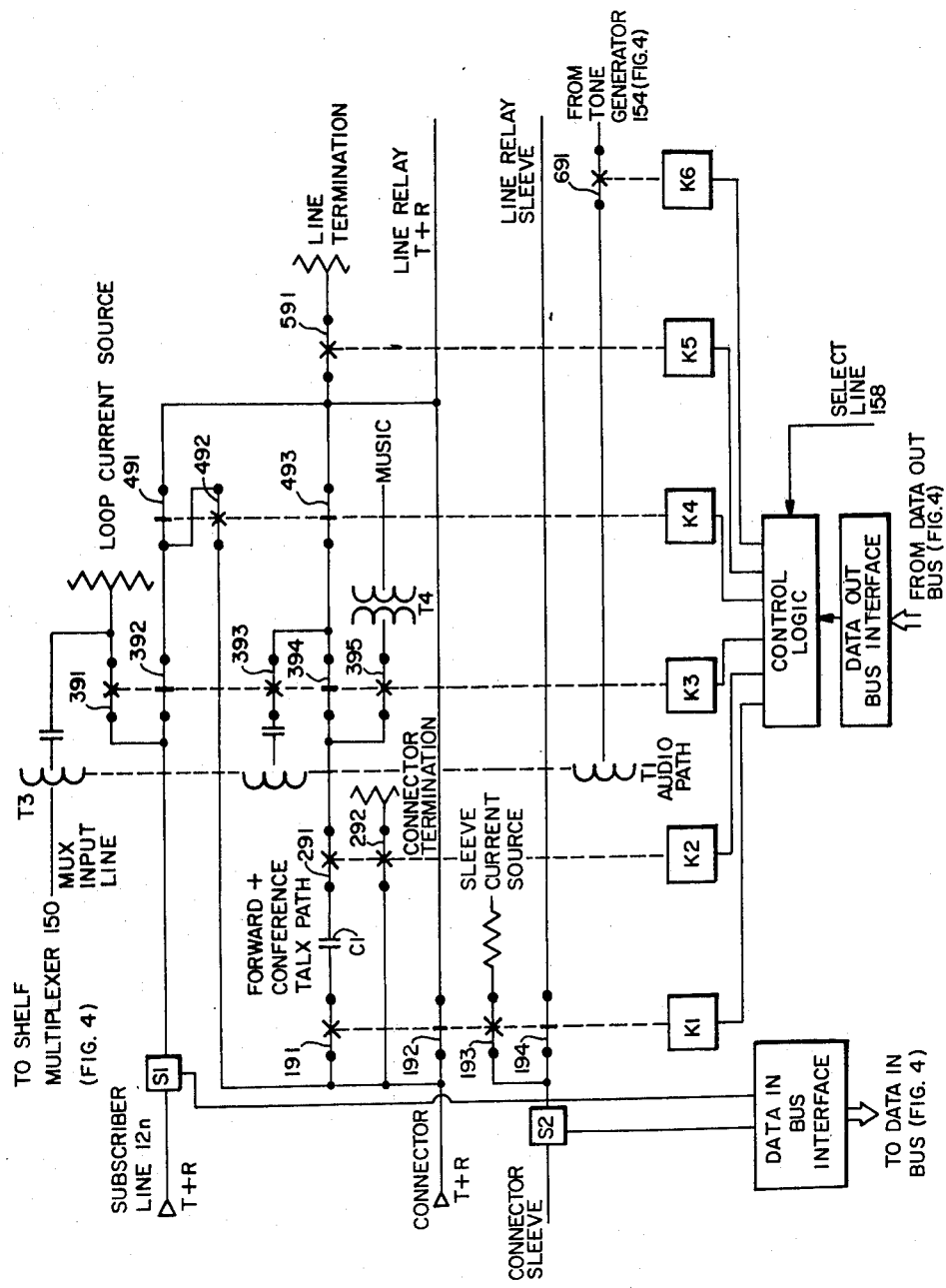
FIG. 6 is a schematic illustration showing further details of a subscriber line circuit in the add-on of FIG. 1.

FIG. 6 illustrates further details of the sensor and relay switching network in each line circuit 136. As indicated in FIG. 6, each line circuit 136 includes a first current sensor S1 which detects current in the subscribers line 12n (e.g., in the subscriber T and R loop), and a second current sensor S2 which detects current in the connector sleeve lead. The sensor S1 detects subscriber off-hook, on-hook, dial pulses and hookswitch flashes. The sensor S2 detects connector sleeve seizure indicating the presence of an incoming call for the line 12n. The outputs of sensors S1 and S2 are logic signals which are coupled through a suitable data bus interface circuit 180 to the low speed DATA IN bus of FIG. 4.

Each line circuit 136 also includes a relay switching network comprising control relays K1 through K6. Commands signals from the low speed DATA OUT bus of FIG. 4 are delivered through a data bus interface circuit 182 to latches in a control logic circuit 184 which drives the relays K1 through K6. The selective energization of the relays K1 and K6 in response to the latched processor command signals establishes the interconnections necessary for the implementation of the special services.

The familiar "detached contact" notation is utilized in FIG. 6 for the relays K1 through K6. According to that notation, an "X" shown intersecting a conductor represents a normally open, or "make", contact of a relay, a bar shown intersecting a conductor at a right angle represents a normally closed, or "break", contact of the relay, where "normally" refers to the unenergized condition of the relay.

Under control of the processor 132, the control relays K1 through K6 can perform the following functions:

1. isolate the line relay circuit from the connector circuit completely, maintaining the connector circuit in an "idle" state independent of the condition of the line relay circuit;
2. provide an audio path only from the line relay circuit to the connector circuit;
3. provide an audio or metallic path from the subscriber line 12n to the connector circuit or from the subscriber line 12n to the line relay circuit;
4. provide a metallic path between the subscriber line 12n, the connector circuit and the line relay circuit;
5. isolate the subscriber line 12n from the connector circuit and from the line relay;
6. feed loop current to the line 12n independent of the condition of the connector circuit and of the line relay circuit;
7. terminate the connector circuit;
8. sieze (i.e., terminate) the line relay circuit;
9. pulse the line relay circuit e.g., to similate dial pulsing);

10. pick up tone dial signals from the subscriber line 12n;

11. send progress and error tones from the tone generator 154 of FIG. 4 to the line 12n; and 12. send music to the connector circuit (e.g., to a calling party).

The following summarizes the operation of the relays K1 through K6 for the various special services provided by the add-on 30.

6a. Normal Calls

In the normal condition, all relays K1 through K6 are released (i.e., de-energized). The subscriber T and R leads are connected through break contact 392 of relay K3 and break contact 491 of relay K4 to the line relay T and R leads; the connector T and R leads are connected through break contact 192 of relay K1 to the line relay T and R leads; and, the connector sleeve is connected through break contact 194 of relay K1 to the line relay sleeve. The connection through the line circuit 136 is thus the same as it is in the normal case through the MDF 16 (FIG. 5) in the office 14.

No special switching is implemented by the relays K1 through K6 during normal rotary dialed outgoing calls and normal incoming calls. During each outgoing call, however, sensor S1 detects the dial pulses which permits the processor 132 to store the number dialed in the memory 134A as the last number entered for the instant recall service.

6b. Tone Dial Calls

Sensor S1 detects an off-hook on the subscriber line 12n. If the tone dialing service is enabled for that line, the processor 132 operates relay K3 which, through its break contact 392, isolates the line 12n from the line relay circuit and which, through its make contact 391, provides loop current to the line 12n. Relay K5 is operated which, through its make contact 591, draws dial tone from the office equipment. Relay K4 is also operated, which, through its break contact 491, prevents the dial tone from passing to the line 12n.

The processor 132 assigns a tone receiver 148 to the line circuit 136, as described above. Relay K4 is then released, allowing dial tone to pass to the line 12n. Tone signals dialed by the subscriber on the line 12n are picked up through transformer coil T3 and coupled over the MUX INPUT line to the shelf multiplexer 150 and ultimately to the assigned tone receiver 148. The dial digits are detected by the processor 132 which, in turn, pulses relay K5 to produce corresponding dial pulses recognizable by the office equipment. Relay K4 is operated during the relay K5 pulsing and released during the interdigit period to prevent distortion of the dial pulses and dialing feedback to the line 12n. When the dial pulsing of relay K5 is completed, relay K4 is released, allowing subscriber communication with the line relay circuit via transformer coil T3.

After a timeout period (e.g., 10–12 seconds) following the last digit, the tone receiver 148 is released. Relays K3 and K5 are also released, leaving a normal outgoing call connection. Any additional tone signals received on the line 12n are ignored. The digits dialed are stored in the memory 134A.

As noted previously, if tone dialing is enabled for a subscriber 12n, the add-on 30 will respond either to rotary dial pulses or to tone dial signals. If dial pulsing is detected by sensor S1, the tone receiver 148 assigned to the line circuit 136 is released and the digits dialed by the subscriber are repeated by the pulsing of relay K5. When relay K5 has pulsed all digits that have been received, all relays previously operated are released, restoring normal operation. Any further digits dialed are handled normally by the office equipment.

6c. Incoming Call Alert

When the line 12n goes off-hook for an outgoing call, events proceed as in the case of a normal or tone dial outgoing call except that, if the incoming call alert service is enabled for the line 12n, relay K1 is operated. An incoming call received while the line 12n is still off-hook does not return a busy signal because the connector sleeve is isolated through open break contact 194. The incoming call is, however, detected by sensor S2.

The processor 132, in response to the incoming call, operates relay K3, enabling subscriber communication with the line relay circuit via transformer coil T2. Relay K5 temporarily operates to hold the outgoing call. Relay K6 temporarily operates to provide an incoming call alert tone to the line 12n through coil T1.

After ½ second, relays K3, K5 and K6 release to restore the forward call. If the subscriber generates a hookswitch flash, it is detected by sensor S1. The processor 132, in turn, operates relay K4 to isolate the line 12n from the line relay circuit and to permit the incoming call to be answered. Relay K5 is also operated to place the outgoing call on hold.

A second flash causes relay K2 to operate, terminating the connector through make contact 292. Relay K3 is operated, providing an audio path between the line 12n and the line relay circuit via coil T2 and coupling music through transformer T4 to the connector (i.e., the incoming caller). Relays K4 and K5 remain operated.

A third flash releases relay K3 to connect the line 12n to the incoming call and to isolate the outgoing call. Relay K2 releases to prevent double termination of the connector.

A fourth flash re-initiates the events caused by the second flash, as described above. An on-hook at any time drops the outgoing call and releases all relays.

6d. Call Conferencing

If, during an incoming call to the line 12n, sensor S1 detects a hookswitch flash on the line 12n and if the call conferencing service is enabled for that line, relay K1 is operated, isolating the connector circuit from the line relay circuit. Relay K2 is operated to terminate and hold the connector. Relay K3 is operated to couple music via transformer T4 to the incoming caller, to provide loop current to the line 12n and to provide an audio path via coil T2 to the line relay circuit. Relay K5 operates to draw dial tone from the office equipment.

Rotary dialing on the line 12n is detected by the sensor S1, which tone dialing on the line 12n is sensed as described in Section 6b above. In either case, the dialing is repeated by a pulsing of relay K5 enabling the outgoing call to be completed through the office 14. The subscriber can talk to the called party via coil T2.

A second flash detected by sensor S1 causes relay K3 to release, providing a talking path through capacitor C1 between the connector circuit and the line relay circuit and connecting the line 12n to the line relay circuit in a conferencing mode. Relay K5 releases to eliminate double termination of the line relay circuit.

An on-hook on the line 12n drops the line relay circuit (i.e., the outgoing call). Loss of loop current detected by sensor S1 causes all relays to release. If the connector is held by the incoming caller, an off-hook on the line 12n returns to the incoming call state. If the incoming call releases during the conferencing arrangement, as detected by sensor S2, all relays release, returning the circuit 136 to its normal outgoing call state.

6e. Call Forwarding

If the call forwarding service is enabled for the line 12n and the sensor S2 detects an incoming call, the processor 132 operates relay K4 to pass, through its make contact 494, ringing to the line 12n. Relay K1 is operated to isolate the connector circuit from the line relay circuit. Relay K5 is operated to draw dial tone from the office equipment.

Relay K5 is pulsed to dial the forwarding telephone number that has been stored in the tape unit 134B by the subscriber. When the pulsing is completed, relay K2 is operated, terminating the connector. Relay K4 is released, completing a talk path between the connector circuit and the line relay circuit through capacitor C1. When the incoming call ends, sensor S2 current disappears and all relays release, releasing the line relay circuit and ending the forward call.

If the line 12n goes off-hook while the dial pulsing is in progress by relay K5, the connector is automatically terminated and a talking path is provided through make contact 492 of the operated relay K4, enabling the incoming call to be answered. Relay K5 is released, dropping the line relay circuit. After a ½ second delay, all other relays are released restoring normal service.

If the line 12n goes off-hook after the dial pulsing by relay K5 has been completed, the forwarded call in progress is joined in a conferencing arrangement as relay K4 is then released. Relay K5 releases, preventing a double termination of the line relay circuit.

6f. Abbreviated Dialing

Sensor S1 detects an off-hook on the line 12n followed by a single dial digit. The digit is stored in the memory 134A as the last number entered over the line 12n. Sensor S1 detects a hookswitch flash. If the abbreviated dialing service is enabled for the line 12n, relay K3 is operated to release the line relay circuit. After about ¼ second, relay K5 is operated to draw dial tone. Relay K5 is then pulsed to dial the telephone number stored in the subscriber's repertory location of memory 134A corresponding to the single digit that was dialed. When the pulsing by relay K5 is completed, all relays are released restoring normal operation.

6g. Instant Recall

Sensor S1 detects an off-hook on the line 12n followed by a hookswitch flash. If the instant recall service is enabled, relays K3 and K5 are operated and relay K5 is pulsed to dial the last number entered in the memory 134A for the line 12n. When pulsing is completed, all relays release to restore normal service.

6h. Restricted Calling

If toll restriction is in effect for the line 12n, sensor S1 detects off-hook and the dialing of multiple digits on the line. The processor 132 recognizes that multiple digits have been dialed and examines the first dialed digit. If the first digit is either a "0" or a "1", the processor 132 operates relay K4 to disconnect the line 12n from the line relay circuit and thereby to prevent the call. The relay K4 is released after a predetermined delay to restore normal service.

If outgoing call restriction is in effect, the operation is similar except that the processor 132 terminates the call no matter what the value of the first dialed digit. However, if the abbreviated dialing service is also in effect for the line 12n, the processor 132 will recognize that only a single digit has been dialed and will thereafter respond to a hookswitch flash to initiate an abbreviated dialing call to the number stored in the subscriber repertory location corresponding to the digit, as described above.

6i. Ringback

The subscriber implements a ringback call by dialing a code, then hanging up until his subset rings. Subscriber off hook is detected by S1 and the code dialed is recognized by processor 132. After the subscriber hangs up, the processor causes the line equipment to be seized and pulsed using relay K5. The subscriber's telephone number is dialed and K1 and K4 are energized such that the subscriber may answer a call passed back on his own line 12n. Upon answer, a short tone is provided via relay K6 to notify him that the call is a ringback call.

6j. Ring Disable

The subscriber may dial a code which causes the processor 132 to energize relay K1 for a prescribed interval of time. During this interval, ringing from incoming calls will not be forwarded to the subscriber's line 12n although the subscriber may use his line to execute normal outgoing calls. At the prescribed time, the equipment under control of processor 132 places a ringback call to the subscriber to notify him that the service is being discontinued.

7. Processor 132

The processor 132 may be of conventional design. As a specific illustrative example, the processor 132 may be a Model 6502 LSI circuit microprocessor of the type sold by MOS Technology of Norristown, Pa. The 6502 is an 8-bit, byte oriented processing system which enables all components in the add-on 30, including memory 134A and tape unit 134B, to be treated as addressable memory locations. For those desiring a detailed description of the 6502, reference may be made to the 650x Hardware Manual published by MOS Technology, which Manual is expressly incorporated herein by reference.

For purposes of the present explanation, it is sufficient to know that the processor 132 periodically scans through all addressable memory locations of buffer memory 140 to extract data therefrom corresponding to subscriber signalling and to the status of each peripheral component in the add-on 30. The processor 132 makes various evaluations based upon the extracted data and periodically writes commands and address signals to the buffer memories 140 and 152 to effect control over the operation of the add-on 30.

Figure 7:
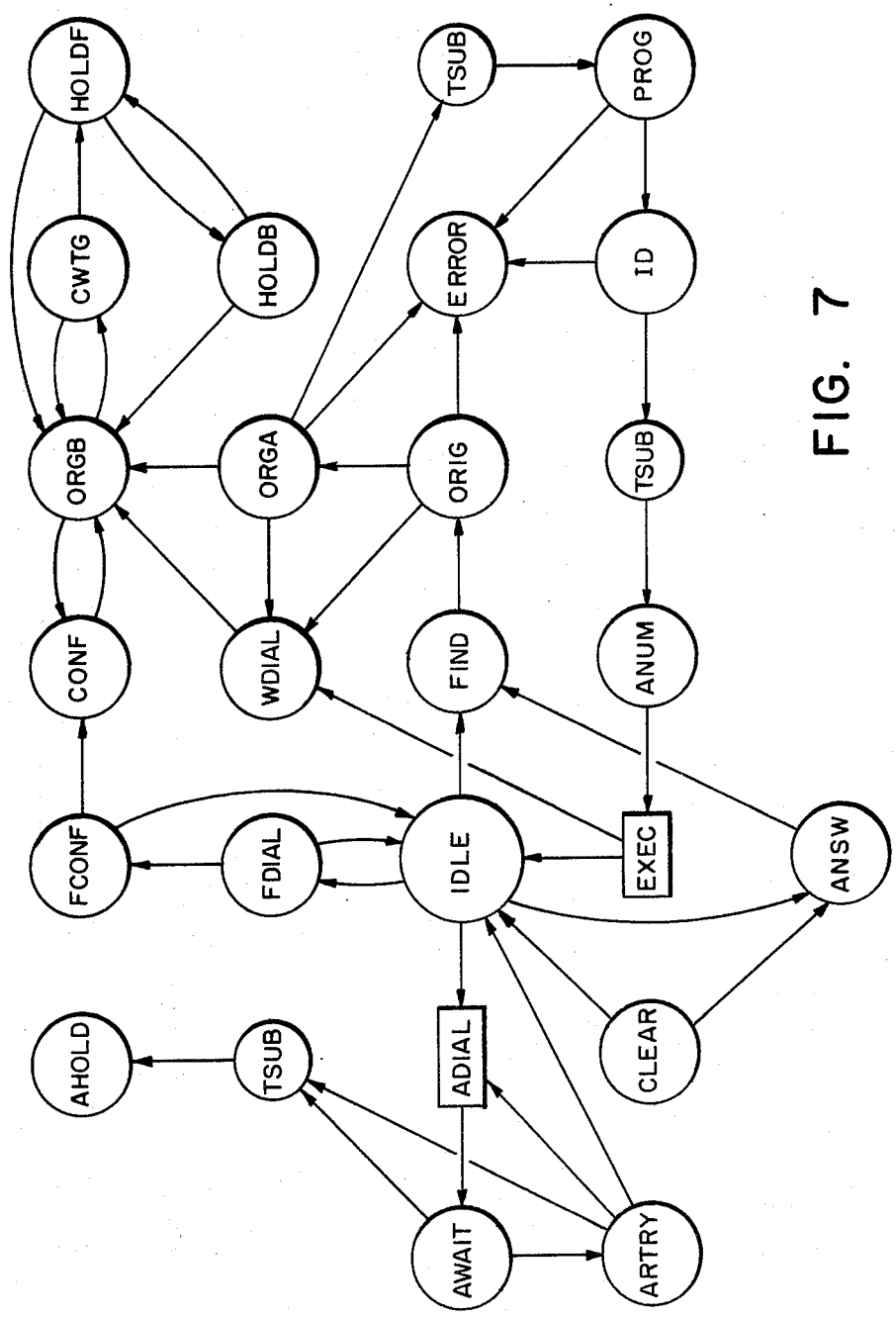
FIG. 7 is a state diagram illustrating the operation of a control processor in the add-on of FIG. 1.

To further illustrate the operation of the processor 132, reference is made to the state diagram of FIG. 7 which illustrates the manner in which the processor 132 responds to subscriber line status and signalling, as detected by the line circuit sensors S1 and S2 of FIG. 6, and operates to implement the special services through control of the line circuit relays K1 through K6 of FIG. 6.

In FIG. 7, CLEAR is a pre-idle state which is temporarily entered by the processor 132 from any other state if an on-hook is detected on the subscriber line 12n. The processor 132 proceeds from the CLEAR state to IDLE after the passage of a predetermined period of time. If the line 12n was previously involved in an incoming call which was terminated by the on-hook, the processor 132 proceeds to the IDLE state only after the connector circuit is released. This prevents the erroneous re-initiation of a forward call. If an off-hook is detected on the line 12n while the processor 132 is in the CLEAR state, ANSW is entered.

The IDLE state is a rest state in which all control relays K1 through K6 of FIG. 6 are released and in which there is no activity on the line 12n except possibly for the presence of an incoming call on the connector circuit for the line 12n. If an incoming call is present and an off-hook is detected, the processor 132 proceeds to the ANSW state. If an incoming call is present and the processor 132 determines that the call forwarding service is enabled for the line 12n, FDIAL is entered to initiate dialing of the forwarding telephone number stored in the memory 134A for the line 12n. If no incoming call is present but an off-hook is detected, the processor 132 recognizes that a normal outgoing call is being initiated and enters FIND where one of the tone receivers 148 is assigned to the line 12n. If a ringback command has been received and the ringback service is enabled for the line 12n, the processor 132 proceeds to ADIAL where it starts dialing the subscriber's number for a ringback call.

The processor 132 remains in the ANSW state as long as a normally answered incoming call is in progress. If a hookswitch flash is received during in the ANSW state and if the call conferencing service is enabled for the line 12n, the processor 132 isolates the line from the incoming call, places the incoming call on hold, draws dial tone from the office line equipment and enters the FIND state to assign a tone receiver 148 to the line 12n, thereby to enable an outgoing call to be dialed. The processor 132 also couples music to the incoming call on hold and sets a flag to indicate that the incoming call is being held.

In the FIND state, dial tone is blocked from the line 12n and a tone receiver is being assigned to the line 12n. If the tone dialing service is not enabled for the line 12n, the processor 132 steps immediately to ORIG. If the tone dialing service is enabled for the line 12n, the processor 132 enters the ORIG state after a tone receiver 148 has been assigned.

In the ORIG state, the processor 132 is prepared to receive subscriber signalling, either a hookswitch flash or a digit. If a flash is detected and if the instant recall service is enabled, the processor 132 enters WDIAL where outpulsing of the last number entered over the line 12n is initiated. If a digit is detected having a value of "0" or "1" and if the toll restriction service is enabled, the call is aborted and ERROR is entered where an error tone is sent to the line 12n indicating an invalid use. Receipt of a valid first digit causes the processor 132 to enter ORGA.

In the ORGA state, the processor 132 is prepared to receive additional subscriber signalling, again either a flash or another digit. A flash indicates abbreviated dialing. If the abbreviated dialing service is enabled, the first digit is used to select the corresponding memory location of the subscriber's abbreviated dialing repertoire and the processor 132 enters the WDIAL state where outpulsing of the selected abbreviated dialing number is initiated. If a flash is detected and the first digit is a "9" or a "0", processor 132 enters the ERROR state to indicate an invalid use, as only the digits "1" through "8" are used for the abbreviated dialing service.

If during in the ORIG state, a second digit is received and the outgoing call restriction service is enabled for the line 12n, the processor 132 again aborts the call and enters the ERROR state to indicate an invalid use. If the first two digits dialed are the add-on program code, the processor 132 enters TSUB where a short duration tone is sent to the line 12n and then enters PROG to prepare for the receipt of subscriber instructions. If the second digit of a normal outgoing call is dialed, ORGB is entered.

In the WDIAL state, outpulsing from memory is in progress. When the outpulsing is completed, the processor 132 proceeds to the ORGB state.

The ORGB state indicates either that the subscriber has dialed at least two digits or that outpulsing from memory has been completed. If an incoming call is being held and a flash is detected, the incoming and outgoing calls are both connected to the line 12n in a conferencing mode and the processor 132 enters CONF. If the incoming call alert service is enabled for the line 12n and an incoming call is detected, an incoming call alert tone is coupled to the line and the processor 132 enters CWTG.

In the CONF state, an incoming call and an outgoing call are both connected to the line 12n in a conferencing mode. If during the CONF state, the incoming call is dropped by the incoming caller, the processor 132 reverts to the ORGB state.

The CTWG state indicates that a subscriber originated outgoing call is in progress and an incoming call is ringing, giving ringback tone to incoming caller. If the incoming caller drops the call, the processor 132 reverts to the ORGB state. If a flash is detected, the processor 132 isolates, holds the outgoing call while the incoming call is terminated and connected to the line 12n. The processor 132 enters HOLDF.

The HOLDF state indicates that an outgoing call is isolated and held while an incoming call is connected to the line 12n. If during the HOLDF state, another flash is detected, the incoming call is isolated and held while the outgoing call is connected to the line 12n. The processor 132 enters HOLDB.

The HOLDB states indicates that an incoming call is being held while the subscriber talks to his original outgoing call. If the incoming call is dropped by the caller, the processor 132 again reverts to the ORGB state while the subscriber continues to talk to the called party. If still another flash is detected, the outgoing call is again isolated and held and the line 12n is again connected to the incoming call. The processor 132 in that event reverts back to HOLDF.

The PROG state indicates that the two digit program code has been dialed and the processor 132 is prepared to receive a two digit command code. If an invalid command is dialed, the ERROR state is entered to indicate this. If a valid command code is dialed that requires an identification code, the processor 132 sends an indicating tone to the line 12n and proceeds to ID. If a valid command is dialed not requiring an identification code, the processor enters TSUB where a short duration tone is sent and then proceeds to ANUM.

In the ID state, a tone burst is coupled to the line 12n before the first digit of the identification code is received. If an invalid identification code is received, the processor 132 enters the ERROR state to indicate this. If a valid identification code is received, the processor 132 enters TSUB to send the short duration tone and then proceeds to the ANUM state.

The ANUM state indicates that the subscriber has supplied the processor 132 with a valid command code and valid identification code, if required. If the command does not require any additional information, the processor 132 proceeds to EXEC where the command is executed and thereafter returns to the IDLE state. If the command requires additional information, the processor 132 remains in the ANUM state until the additional information is received. An on-hook signals the end of the additional data. The processor 132 then proceeds to the EXEC state to execute the command and thereafter returns to the IDLE state.

In the ADIAL state, ringback dialing to the subscriber line 12n is in progress. If during the ADIAL state, the line 12n goes off-hook, the processor 132 goes to the TSUB state to provide a short tone to the line 12n and then proceeds to the IDLE state. After ringback dialing is completed, the processor 132 enters AWAIT.

In AWAIT, the processor 132 is waiting for the office 14 to complete the ringback call connection to the subscriber line 12n. If an off-hook is detected, the processor 132 goes to TSUB to provide a short tone to the line 12n and then proceeds to the IDLE state. If an incoming call is detected, the processor 132 goes to ARING. If a predetermined period of time passes (e.g., 5 seconds), the processor 132 releases the ringback and goes to ARTRY.

In the ARING state, a ringback call has been dialed and an incoming call has been detected. If the line 12n goes off-hook or if the 5 second time period passes, the processor 132 goes to TSUB to provide a short tone to the line 12n and then proceeds to the IDLE state.

The ARTRY state indicates that a ringback call has not been connected through by the office 14, most likely due to office blockage. In the ARTRY state, the processor 132, after the passage of a predetermined period of time (e.g., 25 seconds), re-initiates ringback dialing and enters the ADIAL state. If after three successive tries, a connection to the line 12n and off-hook are not detected, the processor 132 aborts the ringback and returns to the IDLE state.

8. Summary

In summary, the add-on 30 enables telephone companies to provide telephone subscribers connected to a conventional dial pulse actuated switching office with any of a variety of modern services without the need for replacing the office. The add-on 30 is relatively economical in construction and simple to install, requiring no modifications to the office itself but rather only straightforward interface connections to those subscriber circuits to receive the modern services at the main distribution frame of the office. The add-on 30 also requires a minimum of maintenance by telephone company personnel and is specifically structured so as to operate efficiently and reliably in dial pulse actuated offices.

From the subscriber's standpoint, the add-on 30 is desirable because of the wide variety of special services it offers and because it allows the subscriber to select the particular combination of services that best suits his subjective needs or desires. Most of the services can also be directly controlled by the subscriber simply by dialing programming instructions to the add-on 30. This enables the subscriber to exercise control over the services from practically any location as circumstances at his premises vary without the need for contacting telephone company personnel.

As should be apparent, the foregoing discussion describes only one specific illustrative embodiment of the invention. Numerous variations and modifications to the described embodiment will be recognized by those skilled in the art without departing from the scope of the invention as defined by the appended claims.

What I claim as new and desire to secure by Letters Patent of the United States is:

1. In a telephone system of the type including a plurality of subscriber subsets connected by a corresponding plurality of subscriber lines to a telephone switching office that includes dial pulse actuated switching equipment, apparatus connectible within the office for augmenting the switching capabilities thereof by enabling the provision of a plurality of special services to subscribers not otherwise providable by the office itself, said apparatus comprising:

A. line circuit means associated with each subscriber line to receive a special service, each of said line circuit means including
      i. means for sensing circuit status of the subscriber line including signals transmitted from the subscriber subset over the subscriber line to the office, and
      ii. switch means actuated to modify the connection between the subscriber line and the office switching equipment;
   B. buffer storage means for storing subscriber line circuit status and signal information sensed by said line circuit sensing means;
   C. a first bidirectional data bus for transferring information between said buffer storage means and each of said line circuit means;
   D. memory means for storing subscriber identification and class of service information;
   E. processor means responsive to subscriber identification and class of service information stored in said memory means and to subscriber line circuit status and signal information stored in said buffer storage means for recognizing that a special service is to be provided on one of the subscriber lines and for controlling said switch means in the appropriate one of said line circuit means so as to effect the connection modification necessary to provide the special service on that line; and
   F. a second bidirectional data bus for transferring information between said processor means, said memory means and said buffer storage means, said second bus being isolated from said first bus by said buffer storage means.

2. The apparatus of claim 1 in which said line circuit means includes means for transferring the subscriber line circuit status and signal information sensed thereby over said first bus to said buffer storage means;

in which said processor means includes means for reading the subscriber line circuit status and signal information from, and for writing line circuit switch means commands to, said buffer storage means over said second bus; and in which said line circuit means includes means for receiving the line circuit switch commands from said buffer storage means over said first bus.

3. The apparatus of claim 2 further including
A. clock means for controlling the information transfers over said first bus and said second bus, said clock means initiating information transfers over said first and second buses at synchronized times but at a substantially higher transfer rate and a substantially lower duty cycle on said second bus than on said first bus.

4. The apparatus of claim 3 further including
A. filter means associated with said first bus for filtering short duration noise pulses from the information transferred over said first bus.

5. The apparatus of claim 4 in which said buffer storage means includes a plurality of addressable memory locations including one of said memory locations for each of said line circuit means and in which said apparatus further includes:
A. address counter means controlled by said clock means for generating in sequence an address signal corresponding to each of said line circuit means and for coupling said address signals over said first bus to
B. a buffer access means for responding to said address signals and for sequentially accessing the memory locations of said buffer storage means corresponding to said address signals, whereby bidirectional data transfers are effected sequentially over said first bus between each of said line circuit means and its corresponding memory location in said buffer storage means.

6. The apparatus of claim 5 in which said processor means also includes means for generating an address signal corresponding to each of said line circuit means and for coupling said processor generated address signal over said second bus to said buffer access means, in which said buffer access means responds preemptively to the processor generated address signal received over said second bus for accessing the addressable memory location of said buffer storage means corresponding to the processor generated address signal, and in which said processor means initiates a bidirectional data transfer over said second bus to and from the memory location of said buffer storage means corresponding to the processor generated address signal at a rate that is so rapid that said filter means associated with said first bus does not respond to the transfer.

7. The apparatus of claim 1 further including
A. tone receiving means for receiving multifrequency tone signals sensed by said line circuit sensing means on the subscriber lines and for converting the tone signals to logic signals recognizable by said processor means, the logic signals being transferred over said first bus to said buffer storage means, said processor means being responsive to the logic signals for controlling said line circuit switch means to develop corresponding dial pulse signals for actuating the office switching equipment, whereby one of said special services provided by said apparatus is the ability to accommodate multifrequency tone dial subscriber subsets.

8. The apparatus of claim 7 in which the number of said tone receiving means in said apparatus is less than the number of said line circuit means therein and in which said apparatus further includes A. multiplexer means for connecting individual ones of said tone receiving means to individual ones of said line circuit means on an as-needed basis under the control of said processor means.

9. The apparatus of claim 8 further including
A. a second buffer storage means coupling said first bus and said second bus, said second buffer storage means receiving over said second bus and storing tone receiving means assignment data from said processor means, the tone receiving means assignment data being read from said second buffer storage means over said first bus by said multiplexer means.

10. The apparatus of claim 9 in which said multiplexer means comprises a pulse amplitude modulation time division multiplexer circuit.

11. The apparatus of claim 1 further including
A. tone generating means for generating multifrequency tone signals and for coupling the tone signals as reporting signals to the subscriber lines, the tone signals being coupled to the subscriber lines by the actuation of said line circuit switch means by said processor means.

12. The apparatus of claim 1 further including
A. program port means for receiving telephone company provided information including the subscriber identification and class of service information, said program port means being coupled to said first bus whereby the telephone company provided information is transferable over said first bus to said buffer storage means and readable from said buffer storage means by said processor means.

13. The apparatus of claim 1 in which said memory means comprises
i. first data storage means accessible by said processor means for storing information extracted from said buffer storage means, and
ii. a second, non-volatile data storage means accessible by said processor means for storing the subscriber identification and class of service information and information transferred thereto from said first data storage means by said processor means, said second, non-volatile data storage means being capable of retaining the information stored therein in the event of apparatus malfunction or power failure.

14. The apparatus of claim 1 in which the special services provided by said apparatus include an incoming call alert service,
in which said line circuit sensing means includes means for sensing that one of the subscriber lines is involved in a first call and that a second, incoming call has been received in the office for that line,
in which said processor means determines whether or not the incoming call alert service is enabled for that line and, if enabled, operates said line circuit switch means to inhibit the return of a busy signal to the incoming caller and to signal the subscriber line of the presence of the second call,
in which said processor means is responsive to the receipt of a hookswitch flash on the subscriber line for operating said line circuit switch means to place the first call on hold and to connect the second call through to the line.

15. The apparatus of claim 14 in which said processor means is further responsive to the receipt of subsequent hookswitch flashes on the line for operating said line circuit switch means to alternately place the second call and the first call on hold and to alternately connect the first call and second call to the subscriber line, and in which said processor means is still further responsive to the receipt of an on-hook on the subscriber line to operate said line circuit switch means to drop the call connected to the line independently of the call being held.

16. The apparatus of claim 14 further including a music source and in which said processor means is responsive to the receipt of the hookswitch flash to operate said line circuit switch means to couple said music source to the call being held.

17. The apparatus of claim 14 in which said processor means is responsive to the receipt of instruction signals on the subscriber line for enabling and disabling the incoming call alert service for that line, said instruction signals comprising preset dial digit sequences, whereby the incoming call alert service may be enabled and disabled from the subscriber line.

18. The apparatus of claim 1 in which the special services provided by said apparatus include a call conferencing service, in which said line circuit sensing means includes means for sensing that one of the subscriber lines is involved in a first call, in which said processor means determines whether or not the call conferencing service is enabled for that line and, if enabled, is responsive to the receipt of a hookswitch flash on the line during the course of the first call to operate said line circuit switch means to place the first call on hold and to connect the line to the office switching equipment so as to permit a second, outgoing call to be made, in which said processor means is responsive to the receipt of an on-hook on the subscriber line during the course of the second call to operate said line circuit switch means to drop the second call and reconnect the line to the first call, and in which said processor means is further responsive to the receipt of a subsequent hookswitch flash on the subscriber line during the course of the second call to operate said line circuit switch means to connect both the first call and the second call to the line in a conferencing mode.

19. The apparatus of claim 18 further including a music source and in which said processor means is responsive to the receipt of the first hookswitch flash on the line to operate said line circuit switch means to couple said music source to the first call being held.

20. The apparatus of claim 1 in which the special services provided by said apparatus include a call forwarding service, in which said line circuit sensing means includes means for sensing that an incoming call has been received in the office for one of the subscriber lines, in which said memory means includes means for storing a forwarding telephone number for the subscriber line, and in which said processor means determines whether or not the call forwarding service is enabled for that subscriber line and whether or not a forwarding telephone number is stored therefor in said memory means and, if so, operates said line circuit switch means to dial an outgoing call to the forwarding telephone number and to connect the incoming call to the forwarding number.

21. The apparatus of claim 20 in which said processor means is responsive to the receipt of instruction signals on the subscriber line for enabling and disabling the call forwarding service for that line, said instruction signals comprising preset dial digit sequences including digits corresponding to the forwarding telephone number which are stored in said memory means, whereby the call forwarding service may be controlled from the subscriber line.

22. The apparatus of claim 1 in which the special services provided by said apparatus include an abbreviated dialing service, in which said line circuit sensing means includes means for sensing that a digit has been dialed on one of the subscriber lines, in which said memory means includes means for storing a plurality of telephone numbers in locations identified by a digit, and in which said processor means determines whether or not the abbreviated dialing service is enabled for that subscriber line and, if enabled, is responsive to the dialed digit and to the receipt of a hookswitch flash on the line to operate said line circuit switch means to dial an outgoing call to the telephone number stored in the location of said memory means identified by the dialed digit.

23. The apparatus of claim 22 in which said processor means is responsive to the receipt of instruction signals on the subscriber line for enabling and disabling the abbreviated dialing service for that line, said instruction signals comprising preset dial digit sequence including at least one digit identifying one of the telephone number locations of said memory means and additional digits corresponding to the telephone number to be stored in that memory location, whereby the abbreviated dialing service may be controlled from the subscriber line.

24. The apparatus of claim 22 in which the special services provided by said apparatus include the abbreviated dialing service and an outgoing call restriction service, and in which said processor means determines whether or not the abbreviated dialing service and the outgoing call service are enabled for the subscriber line and, if enabled, operates said line circuit switch means to prevent all outgoing calls except to the telephone numbers stored in said memory means locations.

25. The apparatus of claim 24 in which said processor means is responsive to the receipt of instruction signals on the subscriber line for enabling and disabling the outgoing call restriction service, said instruction signals comprising preset digit sequences, whereby the outgoing call restriction service may be enabled and disabled from the subscriber line.

26. The apparatus of claim 1 further including remote program port means coupled to the office switching equipment for receiving instruction signals on an incoming call line to the office other than the subscriber line for controlling the special services for that subscriber line, said instruction signals comprising preset dial digit sequences including digits identifying the subscriber and the subscriber line for which the special services are to be controlled, whereby the special services may be remotely controlled from a line other than the subscriber line to receive the services.

27. In a telephone system of the type including a plurality of subscriber subsets connected by a corresponding plurality of subscriber lines to a telephone switching office that includes a distribution frame and dial pulse actuated call switching equipment including office connector equipment and office line equipment, each subscriber line including a tip lead and a ring lead and having associated therewith a connector circuit including a tip lead, a ring lead and a sleeve lead extending to the office connector equipment and a line circuit including a tip lead, a ring lead and a sleeve lead extending to the office line equipment, said tip leads, said ring leads and said sleeve leads normally being interconnected at the distribution frame, apparatus connectible within the office for augmenting the switching capabilities thereof by enabling the provision of a plurality of special services to subscribers not otherwise providable by the office itself, said apparatus comprising:

A. line circuit means associated with each subscriber line to receive a special service, each of said line circuit means including
  i. means for sensing circuit status of the subscriber line including signals transmitted from the subscriber subset over the subscriber line to the office,
  ii. switch means including a plurality of circuit modifying contacts, and
  iii. connecting means for extending each of said tip leads, said ring leads and said sleeve leads associated with the subscriber line electrically independently of one another from the distribution frame to the circuit modifying contacts of said switch means, said switch means being actuatable to modify the connection between the subscriber line and the office switching equipment;
B. buffer storage means for storing subscriber line circuit status and signal information sensed by said line circuit sensing means;
C. memory means for storing subscriber identification and class of service information; and
D. processor means responsive to subscriber identification and class of service information stored in said memory means and to subscriber line circuit status and signal information stored in said buffer storage means for recognizing that a special service is to be provided on one of the subscriber lines and for controlling said switch means in the appropriate one of said line circuit means so as to effect the connection modification necessary to provide the special service on that line.

28. The apparatus of claim 27 in which said sensing means in each of said line circuit means comprises
  i. a first current sensor connected in series with the subscriber line for sensing subscriber off-hook, on-hook, dial pulsing and hookswitch flashing, and
  ii. a second current sensor connected in series with the sleeve lead of the subscriber connector circuit for sensing the presence of an incoming call to the subscriber line.

29. The apparatus of claim 27 in which said switch means in each of said line circuit means comprises a plurality of relays actuatable under the control of said processor means for variously connecting the subscriber line, its associated connector circuit and its associated line circuit.

30. In a telephone system of the type including a plurality of subscriber subsets connected by a corresponding plurality of subscriber lines to a telephone switching office that includes dial pulse actuated call switching equipment, apparatus connectible within the office for augmenting the switching capabilities thereof by enabling the provision of a plurality of special services to subscribers not otherwise providable by the office itself, the special services provided by said apparatus including a multifrequency tone dialing service, said apparatus comprising:

A. line circuit means associated with each subscriber line to receive a special service, each of said line circuit means including
  i. means for sensing circuit status of the subscriber line including means for sensing multifrequency tone dial signals transmitted from the subscriber subset over the subscriber line to the office, and
  ii. switch means actuatable to modify the connection between the subscriber line and the office switching equipment;
b. means connectible to said line circuit sensing means for converting the multifrequency tone dial signals to logic signals;
C. buffer storage means for storing subscriber line circuit status and signal information including said logic signals from said converting means;
D. memory means for storing subscriber identification and class of service information; and
E. processor means responsive to subscriber identification and class of service information stored in said memory means and to subscriber line circuit status and signal information stored in said buffer storage means for determining whether or not the tone dialing service is enabled for the subscriber line and, if enabled, for responding to said logic signals from said converting means to operate said line circuit switch means to develop dial pulse signals recognizable by the office switching equipment and corresponding to the multifrequency tone dial signals.

31. In a telephone system of the type including a plurality of subscriber subsets connected by a corresponding plurality of subscriber lines to a telephone switching office that includes dial pulse actuated call switching equipment, apparatus connectible within the office for augmenting the switching capabilities thereof by enabling the provision of a plurality of special services to subscribers not otherwise providable by the office itself, the special services provided by said apparatus including an instant recall service, said apparatus comprising:

A. line circuit means associated with each subscriber line to receive a special service, each of said line circuit means including
  i. means for sensing circuit status of the subscriber line including means for sensing the digits of a telephone number dialed on the subscriber line, and
  ii. switch means actuatable to modify the connection between the subscriber line and the office switching equipment;
B. buffer storage means for storing the subscriber line circuit status and signal information sensed by said line circuit sensing means;
C. memory means for storing subscriber identification and class of service information, said memory means storing the digits of the telephone number dialed on the line and retaining that number until a new telephone number is dialed on the line, and
D. processor means responsive to subscriber identification and class of service information stored in said memory means and to subscriber line circuit status and signal information stored in said buffer storage means for determining whether or not the instant recall service is enabled for the line and, if enabled, for responding to the receipt of a hookswitch flash on the line to operate said line circuit switch means to dial an outgoing call to the telephone number stored in said memory means.

32. In a telephone system of the type including a plurality of subscriber subsets connected by a corresponding plurality of subscriber lines to a telephone switching office that includes said pulse actuated call switching equipment, apparatus connectible within the office for augmenting the switching capabilities thereof by enabling the provision of a plurality of special services not otherwise providable by the office itself, the special services provided by said apparatus including a toll restriction service, said apparatus comprising:
   A. line circuit means associated with each subscriber line to receive a special service, each of said line circuit means including
      i. means for sensing circuit status of the subscriber line including means for sensing that an outgoing call has been dialed on the subscriber line, and
      ii. switch means actuatable to modify the connection between the subscriber line and the office switching equipment;
   B. buffer storage means for storing subscriber line circuit status and signal information sensed by said line circuit sensing means;
   C. memory means for storing subscriber identification and class of service information; and
   D. processor means responsive to subscriber identification and class of service information stored in said memory means and to subscriber line circuit status and signal information stored in said buffer storage means for determining whether or not the toll call restriction service is enabled for that line and, if enabled, for operating said line circuit switch means to prevent the outgoing call if it is a toll call.

33. The apparatus of claim 32 in which said processor means is responsive to the receipt of instruction signals on the subscriber line for enabling and disabling the toll call restriction service, said instruction signals comprising preset digit sequences, whereby the toll call restriction service may be enabled and disabled from the subscriber line.

34. In a telephone system of the type including a plurality of subscriber subsets connected by a corresponding plurality of subscriber lines to a telephone switching office that includes dial pulse actuated call switching equipment, apparatus connectible within the office for augmenting the switching capabilities thereof by enabling the provision of a plurality of special services not otherwise providable by the office itself, the special services provided by said apparatus including an outgoing call restriction service, said apparatus comprising:
   A. line circuit means associated with each subscriber line to receive a special service, each of said line circuit means including
      i. means for sensing circuit status of the subscriber line including means for sensing that an outgoing call has been dialed on the subscriber line, and
      ii. switch means actuatable to modify the connection between the subscriber line and the office switching equipment;
   B. buffer storage means for storing subscriber line circuit status and signal information sensed by said line circuit sensing means;
   C. memory means for storing subscriber identification and class of service information; and
   D. processor means responsive to subscriber identification and class of service information stored in said memory means and to subscriber line circuit status and signal information stored in said buffer storage means for determining whether or not the outgoing call restriction service is enabled from that line and, if enabled, for operating said line circuit switch means to prevent the outgoing call.

35. The apparatus of claim 34 in which said processor means is responsive to the receipt of instruction signals on the subscriber line for enabling and disabling the outgoing call restriction service, said instruction signals comprising preset digit sequences, whereby the outgoing call restriction service may be remotely enabled and disabled from the subscriber line.

36. In a telephone system of the type including a plurality of subscriber subsets connected by a corresponding plurality of subscriber lines to a telephone switching office that includes dial pulse actuated call switching equipment, apparatus connectible within the office for augmenting the switching capabilities thereof by enabling the provision of a plurality of special services not otherwise providable by the office itself, the special services provided by said apparatus including a ringback service, said apparatus comprising:
   A. line circuit means associated with each subscriber line to receive a special service, each of said line circuit means including
      i. means for sensing circuit status of the subscriber line including means for sensing that a preset digit sequence instruction signal has been dialed on the subscriber line, and
      ii. switch means actuatable to modify the connection between the subscriber line and the office switching equipment;
   B. buffer storage means for storing subscriber line circuit status and signal information sensed by said line circuit sensing means;
   C. memory means for storing subscriber identification and class of service information; and
   D. processor means responsive to subscriber identification and class of service information stored in said memory means and to subscriber line circuit status and signal information stored in said buffer storage means for determining whether or not the ringback service is enabled for that line, and, if enabled, for responding to said instruction signal and to an on-hook on the line to operate said line circuit switch means to initiate a return call to the subscriber line.

37. The apparatus of claim 36 in which said preset digit sequence instruction signal includes digits corresponding to a time of day,
   in which said apparatus includes a reel time clock accessible by said processor means, and
   in which said processor means is responsive to said real time clock attaining the time of day specified in said instruction signal for initiating a return call to the subscriber line.

38. The apparatus of claim 37 in which said processor means is responsive to the receipt of another preset digit sequence instruction signal on the subscriber line for cancelling the preset digit sequence instruction signal previously received on the subscriber line and for preventing the initiation of a return call to the subscriber line irrespective of the time of day attained by said real time clock.

39. In a telephone system of the type including a plurality of subscriber subsets connected by a corresponding plurality of subscriber lines to a telephone switching office that includes dial pulse actuated call switching equipment, apparatus connectible within the office for augmenting the switching capabilities thereof by enabling the provision of a plurality of special services not otherwise providable by the office itself, the special services provided by said apparatus including a ring disable service, said apparatus comprising:
- A. line circuit means associated with each subscriber line to receive a special service, each of said line circuit means including
  - i. means for sensing circuit status of the subscriber line including means for sensing that a preset digit sequence instruction signal including digits corresponding to a time of day has been dialed on the subscriber line, and
  - ii. switch means actuatable to modify the connection between the subscriber line and the office switching equipment;
- B. buffer storage means for storing subscriber line circuit status and signal information sensed by said line circuit sensing means;
- C. memory means for storing subscriber identification and class of service information;
- D. a real time clock; and
- E. processor means responsive to subscriber identification and class of service information stored in said memory means and to subscriber line circuit status and signal information stored in said buffer storage means for determining whether or not the ring disable service is enabled for the subscriber line and, if enabled, for responding to the receipt of said instruction signal to operate said line circuit switch means to inhibit the application of ringing voltage to the line during an incoming call thereby to prevent ringing at the subscriber subset, said processor also being responsive to said real time clock attaining the time of day specified in said instruction signal for operating said line circuit switch means to again permit the application of ringing voltage to the line during incoming calls.

40. The apparatus of claim 39 in which said processor means is responsive to the receipt of another preset digit sequence instruction signal on the subscriber line for cancelling the the preset digit sequence instruction signal previously received on the subscriber line and for again permitting the application of ringing voltage to the line during incoming calls irrespective of the time of day specified in said previously received preset digit sequence instruction signal.

41. In a telephone system of the type including a plurality of subscriber subsets connected by a corresponding plurality of subscriber lines to a telephone switching office that includes dial pulse actuated call switching equipment, apparatus connectible within the office for augmenting the switching capabilities thereof by enabling the provision of a plurality of special services to subscribers not otherwise providable by the office itself, the special services provided by said apparatus including an abbreviated dialing service and an outgoing call restriction service, said apparatus comprising:
- A. line circuit means associated with each subscriber line to receive a special service, each of said line circuit means including
  - i. means for sensing circuit status of the subscriber line including signals transmitted from the subscriber subset over the subscriber line to the office, and
  - ii. switch means actuatable to modify the connection between the subscriber line and the office switching equipment;
- B. buffer storage means for storing subscriber line circuit status and signal information sensed by said line circuit sensing means;
- C. memory means for storing subscriber identification and class of service information which information includes a plurality of telephone numbers in locations identified by a preset digit code; and
- D. processor means responsive to subscriber identification and class of service information stored in said memory means and to subscriber line circuit status and signal information stored in said buffer storage means for determining whether or not the abbreviated dialing service and the outgoing call service are enabled for the subscriber line and, if enabled, for operating said line circuit switch means to prevent all outgoing calls from the subscriber line except to the telephone numbers stored in said memory means locations and identified by the preset digit code.

* * * * *